United States Patent
Li et al.

(10) Patent No.: US 12,428,598 B2
(45) Date of Patent: Sep. 30, 2025

(54) LONG-AFTERGLOW LUMINESCENT MATERIAL

(71) Applicant: FUDAN UNIVERSITY, Shanghai (CN)

(72) Inventors: Fuyou Li, Shanghai (CN); Ming Xu, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 928 days.

(21) Appl. No.: 17/600,929

(22) PCT Filed: Apr. 4, 2019

(86) PCT No.: PCT/CN2019/081491
§ 371 (c)(1),
(2) Date: Oct. 1, 2021

(87) PCT Pub. No.: WO2020/199191
PCT Pub. Date: Oct. 8, 2020

(65) Prior Publication Data
US 2022/0204838 A1    Jun. 30, 2022

(51) Int. Cl.
*C09K 11/06*    (2006.01)
*C09K 11/02*    (2006.01)
*C09K 11/65*    (2006.01)

(52) U.S. Cl.
CPC .............. *C09K 11/06* (2013.01); *C09K 11/02* (2013.01); *C09K 11/65* (2013.01);
(Continued)

(58) Field of Classification Search
CPC ......... C09K 11/02; C09K 11/06; C09K 11/65; C09K 2211/1033; C09K 2211/1044; C09K 2211/1088; C09K 2211/18
See application file for complete search history.

(56) References Cited

U.S. PATENT DOCUMENTS

| | | | | |
|---|---|---|---|---|
| 3,717,659 A | * | 2/1973 | Siegrist et al. ...... | C07D 263/32 548/134 |
| 3,732,221 A | * | 5/1973 | Siegrist et al. ...... | C07D 249/22 544/242 |

(Continued)

FOREIGN PATENT DOCUMENTS

| | | |
|---|---|---|
| CA | 1054971 A | 5/1979 |
| CN | 104610957 A | 5/2015 |

(Continued)

OTHER PUBLICATIONS

Schaap et al., "Polymer-Based Sensitizers for Photooxidations," *Journal of the American Chemical Society* 97(13):3741-3745, Jun. 25, 1975. (5 pages).

(Continued)

*Primary Examiner* — C Melissa Koslow
(74) *Attorney, Agent, or Firm* — Seed Intellectual Property Law Group LLP

(57) ABSTRACT

Disclosed is a long-afterglow luminescent material, comprising A) at least one light-absorbing agent, B) at least one luminescent agent, and C) at least one photochemical cache agent. The light-absorbing agent and the luminescent agent are compounds having different structures, and the cache agent is selected from one or more compounds of formula (I), (II) and/or (III).

(I)

(Continued)

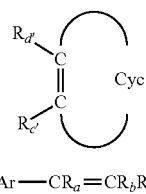
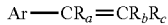

The material has luminescent intensity reaching the level of commercialized inorganic long-afterglow powder $SrAl_2O_4$: $Eu^{2+}$, $Dy^{3+}$, and can emit light when the exciting light is turned off with a light emitting time up to 100 ms to 3600 s.

27 Claims, 3 Drawing Sheets

(52) U.S. Cl.
CPC ............... *C09K 2211/1033* (2013.01); *C09K 2211/1044* (2013.01); *C09K 2211/1088* (2013.01); *C09K 2211/1092* (2013.01); *C09K 2211/1096* (2013.01); *C09K 2211/18* (2013.01)

(56) References Cited

U.S. PATENT DOCUMENTS

| | | |
|---|---|---|
| 6,406,667 B1 | 6/2002 | Singh et al. |
| 2015/0267108 A1 | 9/2015 | Xu et al. |
| 2016/0185765 A1 | 6/2016 | Sakai et al. |
| 2016/0248036 A1 | 8/2016 | Goushi et al. |
| 2018/0346807 A1 | 12/2018 | Kabe et al. |
| 2018/0370957 A1 | 12/2018 | Gao et al. |

FOREIGN PATENT DOCUMENTS

| | | |
|---|---|---|
| CN | 105580153 A | 5/2016 |
| CN | 105636949 A | 6/2016 |
| CN | 106883163 A | 6/2017 |
| CN | 107987061 A | 5/2018 |
| CN | 108285452 A | 7/2018 |
| CN | 108586441 A | 9/2018 |
| CN | 108603108 A | 9/2018 |
| JP | 2007-217397 A | 8/2007 |
| WO | 2019/027370 A1 | 2/2019 |

OTHER PUBLICATIONS

Zaklika et al., "Enhanced Chemiluminescence from the Silica Gel Catalyzed Decomposition of a 1,2-Dioxetane," *Journal of the American Chemical Society* 100(1):318-320, Jan. 4, 1978. (3 pages).

* cited by examiner

LONG-AFTERGLOW LUMINESCENT MATERIAL

FIELD OF INVENTION

The present invention relates to a luminescent material, in particular to a long-afterglow luminescent material based on a photochemical mechanism. In addition, the present invention further relates to application and a preparation method of the long-afterglow luminescent material.

BACKGROUND OF THE INVENTION

A long-afterglow luminescent material is a special kind of luminescent materials that can continue to emit light for a long time after removal of an excitation light source. In the prior art, a luminescent lifetime of the long-afterglow luminescent material is usually greater than one hundred milliseconds. The long-afterglow luminescent material has important application value in low-light lighting, display decoration, safety signs, emergency instruction, biomedicine, life science, environmental engineering and other fields. At present, commercialized long-afterglow luminescent materials are generally rare-earth-doped aluminate, silicate and titanate.

In a long-afterglow luminescent material based on a rare-earth-doped inorganic system, a traditional luminescent process is a photophysical process. In a photoluminescence mechanism or a long-afterglow luminescent mechanism, the luminescent material absorbs light energy and stores the energy on an excited state energy level or in a lattice defect, part of the energy is then released in the form of light through a process of radiation transition, where only energy conversion occurs.

These rare-earth-doped inorganic long-afterglow luminescent materials are usually prepared by solid-state high-temperature calcination. Solid-state high-temperature calcination is beneficial to obtaining a better afterglow property and therefore has become the most important production method for this kind of materials. However, a high-temperature solid-state reaction is harsh in condition and high in energy consumption. It is difficult to control the uniform morphology. A particle size is generally large and a luminescent brightness drops sharply after grinding and refinement, so it is unable to prepare high-quality long-afterglow luminescent nanoparticles.

In recent years, due to easy preparation and the flexible material morphology, people have devoted themselves more and more to the development of long-afterglow materials of an organic system.

For example, CN106883163A provides an organic compound with a long-afterglow effect and a preparation method and application thereof. A luminescent time of an organic crystal prepared from a small molecule compound can reach the magnitude of hundreds of milliseconds.

In addition, CN108603108A provides a light accumulating material, which can be observed to emit light at 10K after stopping the irradiation of it. The light accumulating material is composed of electron donor molecules with a stable free radical cation state and electron acceptor molecules with a stable free radical anion state. In the case of not using rare-earth elements but only using organic compounds, the light accumulating material can achieve long-time afterglow emission.

In addition, WO2019/027370A1 discloses polymer nanoparticles capable of emitting near-infrared afterglow for biological application. The polymer nanoparticles include a special optically-active semiconducting polymer, an optional amphiphilic copolymer, and an optional small molecule dye with near-infrared emission. This is an organic polymer system different from rare-earth-doped inorganic nanoparticles.

In the long-afterglow luminescent material based on the organic system, the luminescent process may involve photochemical interaction between various chemical substances, wherein after a series of photochemical energy conversion and metabolic processes, input excitation light energy is finally released in the form of luminescence, so as to achieve long-afterglow luminescence. Energy conversion and metabolism processes include energy input, energy storage, energy migration, energy cache, energy extraction, energy transfer and energy release. Photochemical reactions are generally accompanied by the processes of energy absorption and release. The chemical substances have a function of storing energy and can also release the stored energy. In these processes, the energy may be light energy, and the chemical substances may be in a ground state or an excited state.

However, the current organic long-afterglow materials are generally weak in luminescence and have a short afterglow time. Moreover, organic long-afterglow luminescence generally requires the material to be made into a crystalline powder or polymer film material state. These matrix or material states can reduce energy dissipation and reduce a quenching effect of factors such as oxygen and water, but at the same time, the material processing and practical application are made to still have major limitations. In addition, the current organic long-afterglow materials are still not diverse and flexible enough in terms of formula selection.

SUMMARY OF THE INVENTION

Aiming at the above defects of the prior art, the present invention uses characteristics of a photochemical reaction to introduce the photochemical reaction between light energy input and light energy output, combines photophysics with chemistry to establish a concept of photochemical energy metabolism, and develops a photochemically-based long-afterglow luminescent system. The present invention enables an originally very rapid photon radiative transition process (nanosecond magnitude to microsecond magnitude) to be changed through the photochemical reaction, and the energy is slowly released and finally emitted in the form of light energy, thereby obtaining ultra-long luminescent time (millisecond magnitude to hour magnitude) and greatly improving the long-afterglow luminescence. Based on this, the luminescent time after turning off a charged light source is determined by the rate of the photochemical reaction, that is, long luminescent time does not need to depend on a rigid matrix environment or an existential state of crystals, so that the long-afterglow luminescence can be realized in various states or forms.

In present application, the term photochemical reaction is a series of chain reactions, including reaction processes of photochemical addition, photooxidation, photochemical dissociation, and bond-breaking recombination.

Therefore, in a first aspect, the present invention provides a long-afterglow luminescent material, comprising:
  A) at least one light-absorbing agent,
  B) at least one luminescent agent, and
  C) at least one photochemical cache agent;
  wherein, the light-absorbing agent and the luminescent
    agent are compounds having different structures, and the cache agent is selected from compounds of formula (I), (II) and/or (III) described hereinafter.

In a second aspect, the present invention provides uses of a long-afterglow material, as a light source, luminescent technology and fluorescence control platform, to be used for up-conversion luminescence, biological imaging, surgical navigation, homogeneous detection, lateral chromatography, catalytic synthesis, photochemical reaction, plant research, single particle tracing, luminescent probes, indication, display, anti-counterfeiting, information encryption, information storage, quantum teleportation, ultra-micro ranging and photochemical invisibility, etc.

In a third aspect, the present invention also provides a method for preparing a long-afterglow material, which includes: (1) providing components A) to C) and an optional D), and (2) mixing the components A) to C) and the optional D) or mixing them with a carrier medium component E) for dissolving, dispersing or adsorbing the components A) to C) so as to obtain a mixture.

The components of the long-afterglow material according to the present invention are flexible in preparation, the composition and properties of the material can be designed according to actual demands, flexible and diverse appearance forms can be obtained through different preparation methods, and it has tailorable luminescent performance. A wavelength of charged excitation light and a wavelength of the long-afterglow luminescence can be adjusted respectively, and it is convenient to adjust and replace a combination scheme of the light-absorbing agent and the luminescent agent, so as to efficiently realize the colorful long-afterglow luminescence.

Preferably, the long-afterglow luminescent material according to the present invention is an organic system, which does not contain or contains a very small amount of rare-earth-doped inorganic luminescent nanoparticles such as $SrAl_2O_4:Eu^{2+}, Dy^{3+}$, for example by weight based on the material mixture, no more than 0.1%, preferably no more than 0.01%, more preferably no more than 0.001% or 0.0001%, and most preferably about 0% of rare-earth-doped inorganic luminescent nanoparticles.

The luminescent intensity of the long-afterglow material according to the present invention can reach a level of commercialized inorganic long-afterglow powder $SrAl_2O_4$: $Eu^{2+}$, $Dy^{3+}$. In particular, the long-afterglow material according to the present invention can continue to emit the light after the excitation light is turned off, and the long-afterglow luminescent time can reach 100 ms to 3600 s, preferably 500 ms to 1800 s, and more preferably 1 s to 600 s. A long-afterglow luminescent brightness of the long-afterglow material according to the present invention can reach 0.1 mcd m$^{-2}$ to 20000 mcd m$^{-2}$, preferably 0.32 mcd m$^{-2}$ to 10000 mcd m$^{-2}$, and more preferably 1 mcd m$^{-2}$ to 5000 mcd m$^{-2}$. Based on the above long-afterglow luminescent property, the present invention can provide a complete material basis for long-afterglow-related application research.

Light-Absorbing Agent and Luminescent Agent

In the present application and in the prior art, the light-absorbing agent generally refers to a substance that can absorb and capture light energy from natural light sources or artificial light sources. A selection range of a photon absorption reagent includes a traditional photosensitive reagent and other energy donor materials. The luminescent agent generally refers to a substance that can finally emit energy in the form of light energy. The luminescent agent may be a luminescent substance capable of generating fluorescence or phosphorescence. In order to achieve the beneficial effects of the long-afterglow material of the present invention, especially, for example, to improve an afterglow intensity and time, the two components of the luminescent agent and the light-absorbing agent are clearly distinguished in a composition of the present invention, so that the two components undertake the effects of absorbing the light energy and releasing the light energy respectively, so as to realize an energy utilization path of energy input, energy buffer and energy output after being combined with the specifically-screened photochemical cache agent. This also means that, in an advantageous implementation, a compound having both a light-absorbing group and a luminescent group in structure so as to perform two functions with the same molecule is not the luminescent agent or the light-absorbing agent according to the present invention, and neither the excellent technical effect of the present invention will be obtained. On the one hand, such compound means packaging and binding the light-absorbing agent and the luminescent agent together with their properties, and therefore, the excitation and luminescence performance of the long-afterglow material cannot be adjusted separately. For example, when a compound based on the actual excitation and charging requirements is selected, the luminescent properties of the material are also fixed at the same time, and vice versa. On the other hand, such compound means fixing the ratio of the light-absorbing agent to the luminescent agent to be, for example, 1:1, therefore the intensity of the light absorption degree and the luminescent level cannot be adjusted at the same time. Moreover, relatively few materials have both efficient light absorbing and efficient luminescent functions, which limits the diversity of the long-afterglow materials.

In the long-afterglow luminescent material according to the present invention, the selection of light-absorbing agent and luminescent agent has certain rules and standards. Generally speaking, a compound with a larger molar light-absorbing coefficient is selected as a light-absorbing agent, such as a photosensitizer or an energy donor dye; and a compound with a higher luminescent quantum efficiency is selected as a luminescent agent, such as a luminescent dye. In addition, an absorption peak of the light-absorbing agent should overlap as little as possible with an emission peak of the luminescent agent to avoid the adverse effect that the long-afterglow luminescence is absorbed by the absorbent and weakened. The above selection standards are easy to understand for those skilled in the art.

In principle, as long as the above selection standards are met, there are no special limitation on categories of the luminescent agent and light-absorbing agent themselves. However, it is advantageous that the light-absorbing agent and the luminescent agent are respectively at least one compound of different types selected from the following list: polymethine cyanine dyes, porphyrin and phthalocyanine dyes and complexes thereof, methylene blue compounds, phycoerythrin, hypocrellin, benzophenone compounds, metal-organic frameworks (MOFs), quantum dots (QDs), graphene, carbon nanotubes, titanium dioxide semiconductors, iridium complexes, rare-earth complexes, polyfluorene compounds, coumarin compounds, naphthalimide compounds, triacene and higher acene compounds, rhodamine compounds, fluorescein compounds, dipyrromethene boron difluoride compounds (BODIPY), resorufin compounds, pyrazoline compounds, triphenylamine compounds, carbazole compounds, green fluorescent protein, Bimane compounds, perovskite compounds, thermally activated delayed fluorescence (TADF) compounds, and derivatives and copolymers of these compounds.

(1) Light-Absorbing Agent

Preferably, the light-absorbing agent may be selected from polymethine cyanine dyes, porphyrin and phthalocyanine dyes and complexes thereof, methylene blue compounds, phycoerythrin, hypocrellin, benzophenone compounds, metal-organic frameworks (MOFs), quantum dots (QDs), graphene, carbon nanotubes, titanium dioxide semiconductors, and derivatives and copolymers of these compounds. These compounds themselves are known to those skilled in the art, and some non-limiting examples of the light-absorbing agent are mentioned below.

As the polymethine cyanine dyes, for example, the following compounds may be mentioned:

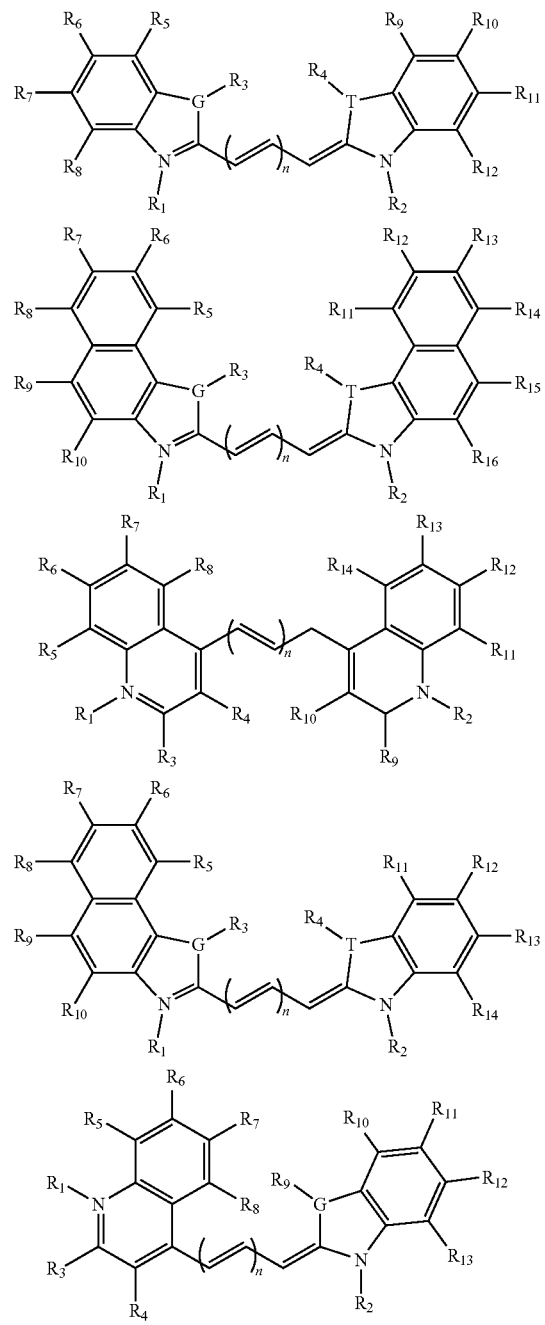

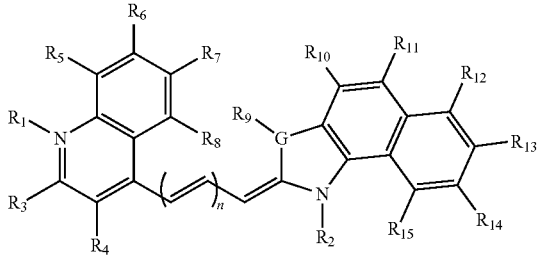

As the porphyrin dyes, for example, the following compounds may be mentioned:

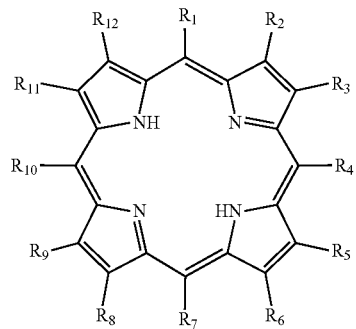

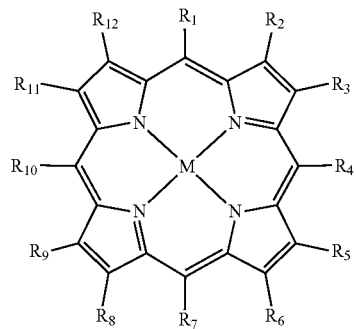

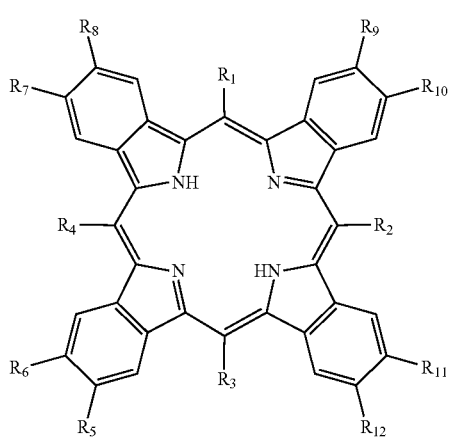

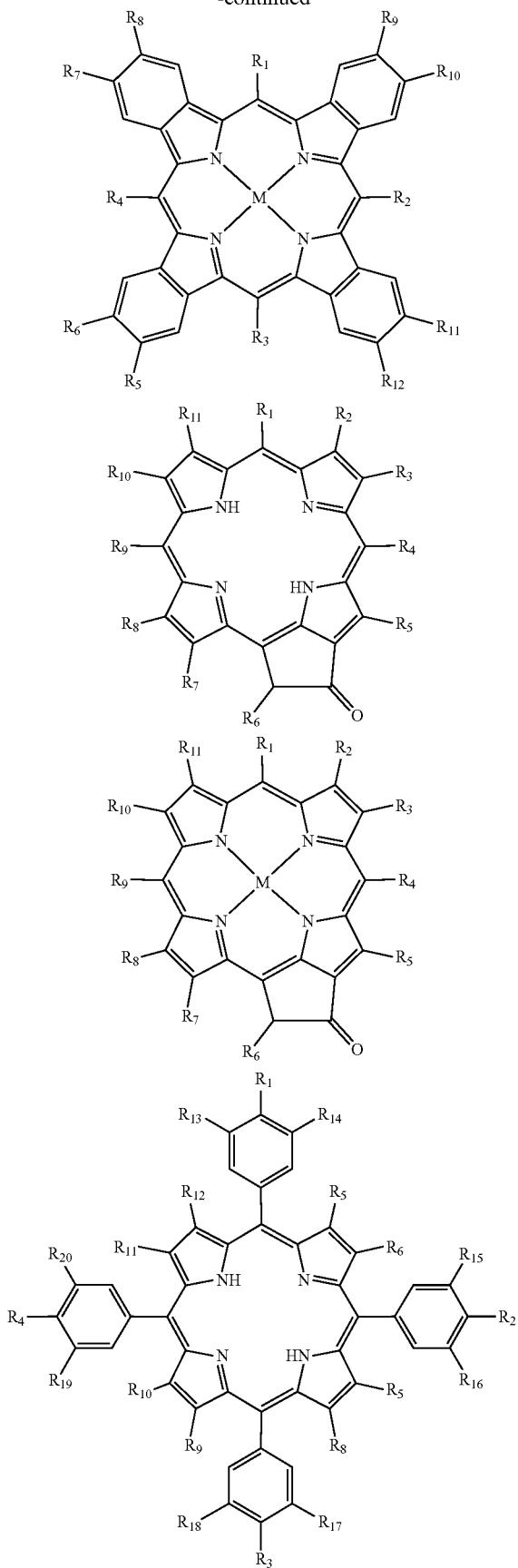
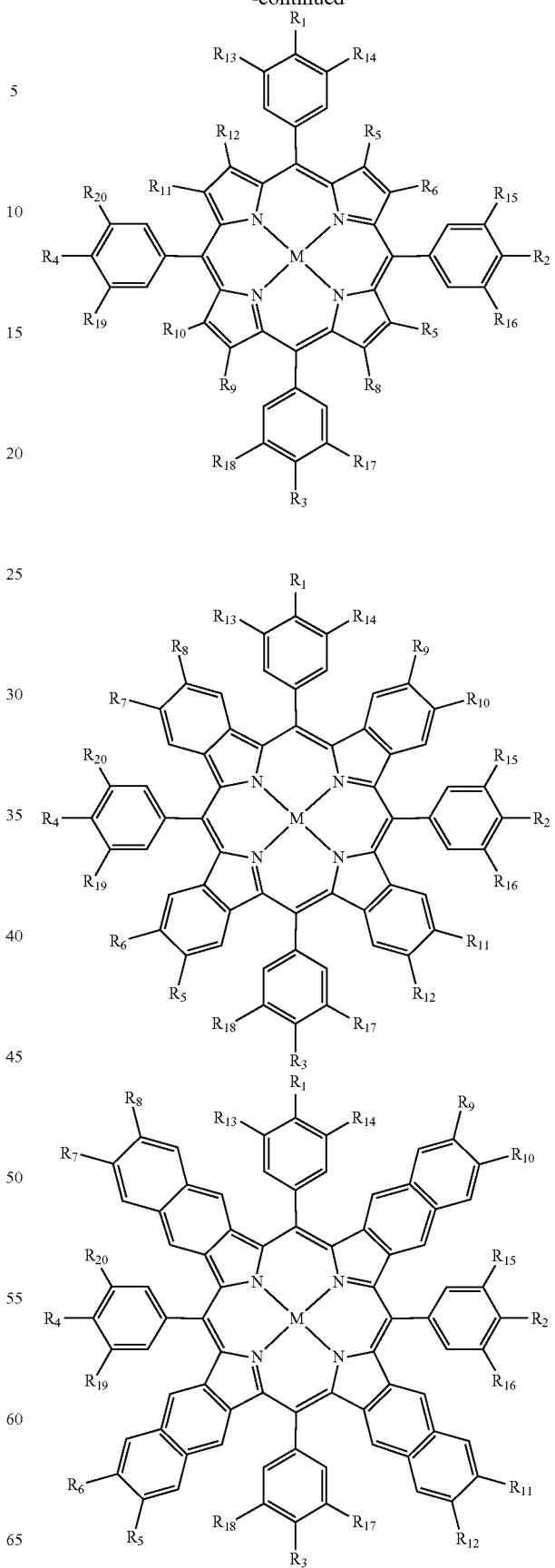

-continued
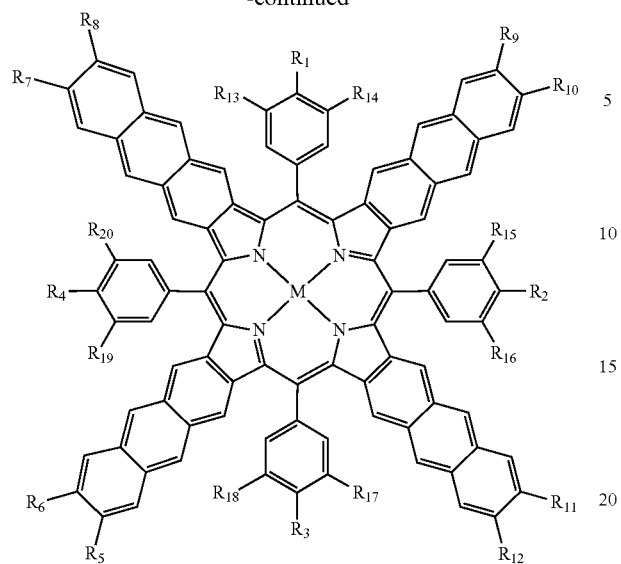
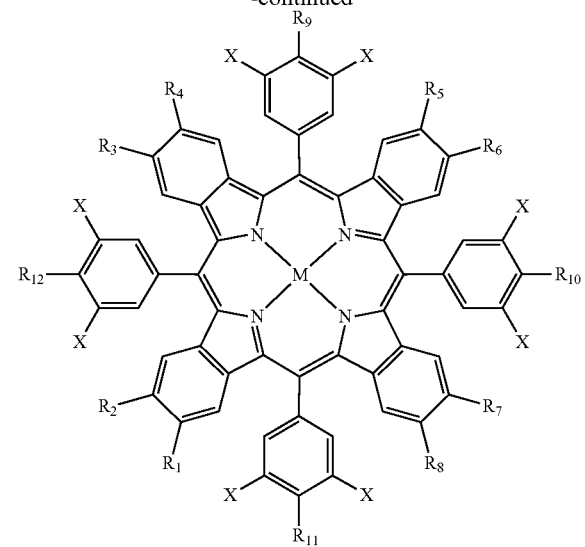
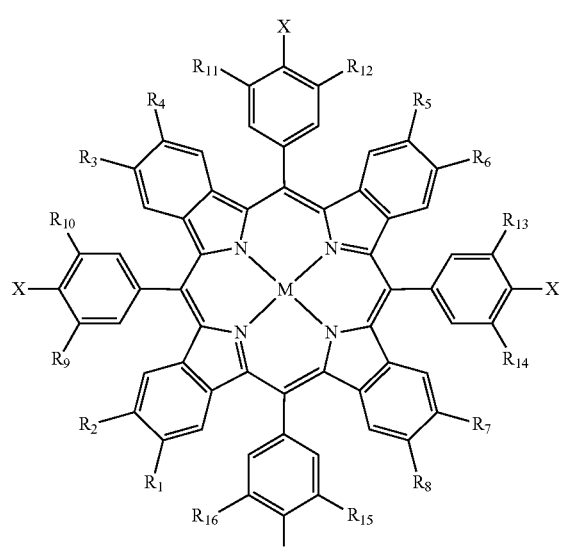
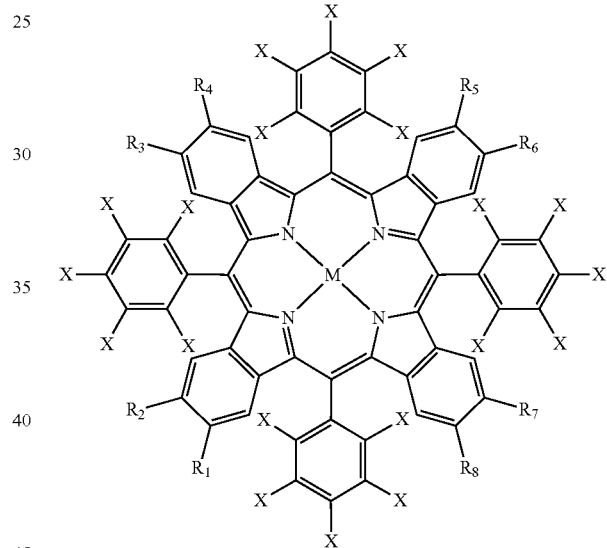
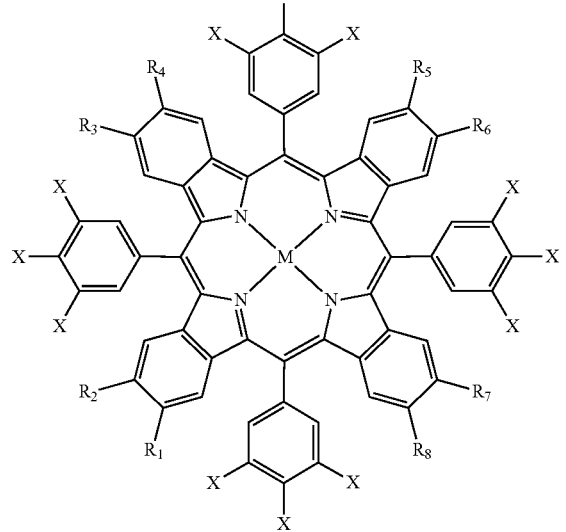
As the phthalocyanine dyes, for example, the following may be mentioned:
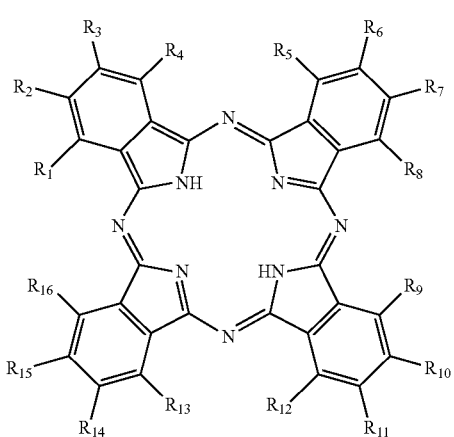

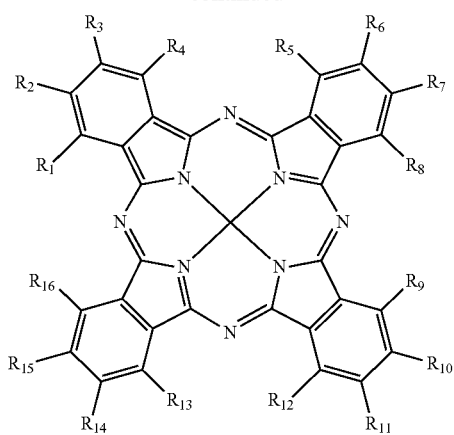
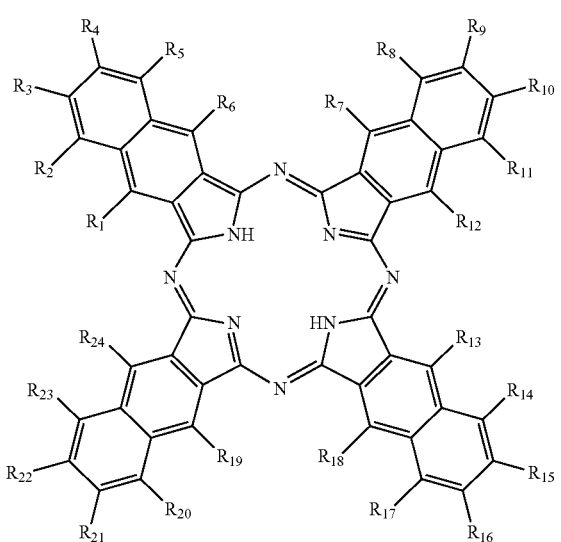
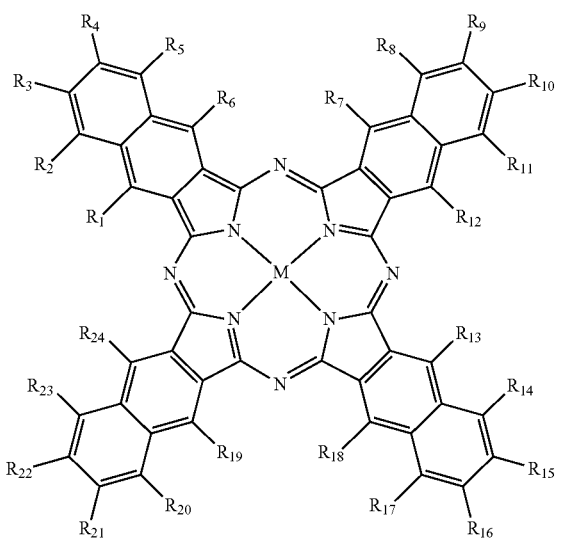
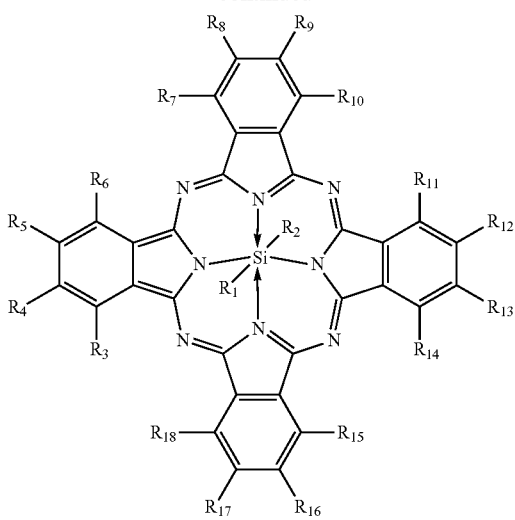
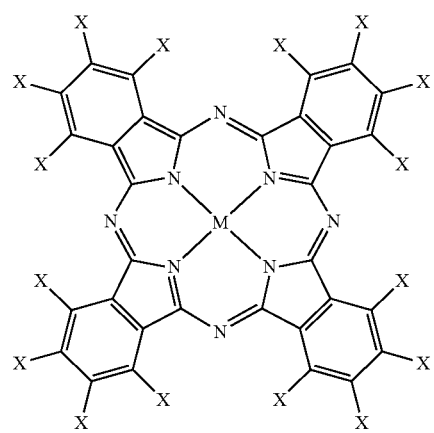
As the benzophenone compounds, for example, the following may be mentioned:
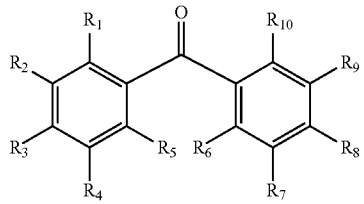
As the methylene blue compounds, for example, the following may be mentioned:
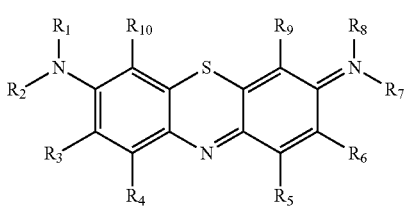

In structural formulae of these light-absorbing agent compounds shown above,
n=an integer greater than or equal to 1, such as 1, 2, 3, 4;
G and T are C or heteroatoms selected from, for example, O, S, Se, Te or N;
X represents halogen such as F, Cl, Br, I; and
M=metal elements such as transition metal elements, such as Al, Pd, Pt, Zn, Ga, Ge, Cu, Fe, Co, Ru, Re, Os, etc.

Each substituent R, for example $R_{1-24}$, represents H, hydroxyl, carboxyl, amino, mercapto, ester, an aldehyde group, nitro, sulfo, halogen, or alkyl having 1 to 50, preferably 1 to 24, for example 2 to 14 carbon atoms, alkenyl, alkynyl, aryl, heteroaryl with N, O, or S, alkoxy, alkylamino, or a combination thereof. Preferably, the above R groups are each independently selected from methoxy, ethoxy, dimethylamino, diethylamino, methyl, ethyl, propyl, butyl, tert-butyl, phenyl or a combination thereof.

Suitable quantum dot materials include, for example, graphene quantum dots, carbon quantum dots, heavy metal quantum dots, and heavy metal-free quantum dots.

The graphene quantum dots include, for example, graphene oxide quantum, graphene quantum, carboxyl graphene quantum, hydroxy graphene quantum dots, amino graphene quantum dots, chlorine graphene quantum dots, imidazole graphene quantum dots, and the like.

The heavy metal quantum dots include, for example, $Ag_2S$, CdS, CdSe, PbS, CuInS, CuInSe, CuInGaS, CuInGaSe quantum dots. A shell layer may be wrapped around it to form a core-shell structure. The shell layer may be one or more of $Ag_2S$, CdS, CdSe, PbS, CuInS, CuInSe, CuInGaS, CuInGaSe, or a ZnS layer.

The heavy metal-free quantum dots include, for example, InP quantum dots, which can be wrapped with a shell layer to form a core-shell structure, and the shell layer is, for example, a ZnS layer.

A size of the quantum dots may be 1 nm to 10 nm.

Optionally, the quantum dots may also be modified with surface ligands. The surface ligands may be, for example, oleic acid, oleylamine, octadecene, octadecylamine, dodecanethiol, and combinations thereof. In some cases, the ligands on surfaces of the quantum dots are partially replaced with a molecular structure containing a triplet state through a ligand exchange strategy, such as carboxyanthracene, carboxytetracene, carboxypentacene, aminoanthracene, aminotetracene, aminopentacene, mercaptoanthracene, mercaptotetracene, mercaptopentacene, etc.

The metal-organic frameworks are organic-inorganic hybrid materials provided with intramolecular pores and formed by self-assembly of organic ligands and metal ions or clusters through coordination bonds. For suitable metal-organic frameworks (MOFs) materials, please refer to the review paper Science 2013, 341, 1230444 by Omar M. Yaghi et al., the full text of which is hereby incorporated into the present application.

In one more preferable implementation, the light-absorbing agent is preferably selected from porphyrin and phthalocyanine dyes and complexes thereof, methylene blue compounds, hypocrellin, metal-organic frameworks (MOFs), quantum dots (QDs), and derivatives of these compounds.

Most preferably, the light-absorbing agent is selected from one or more of the following exemplary compounds:

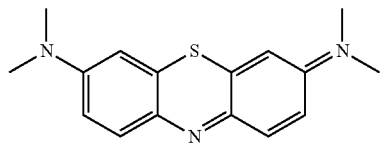

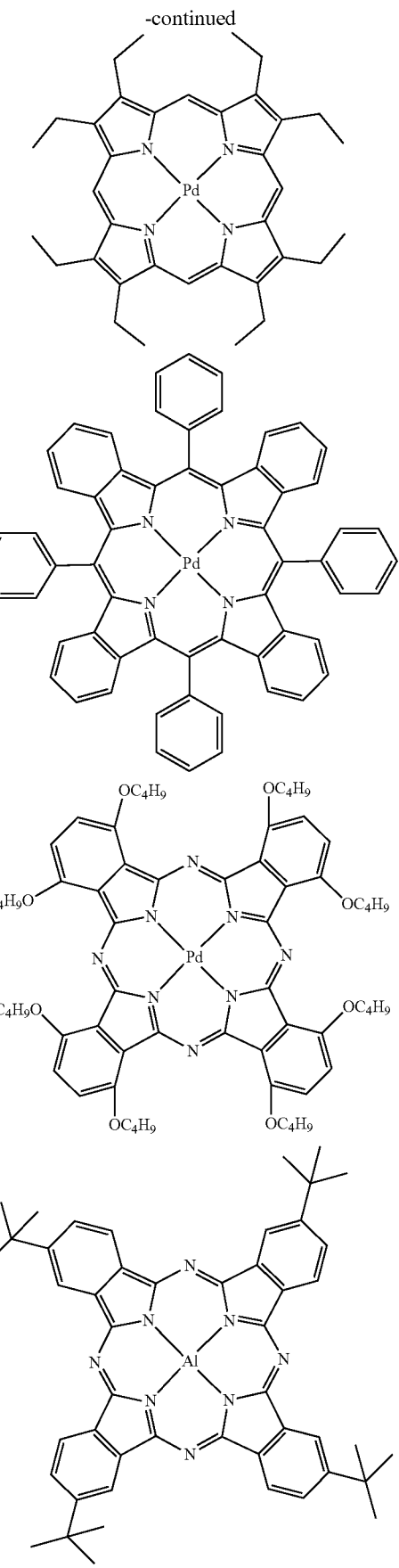

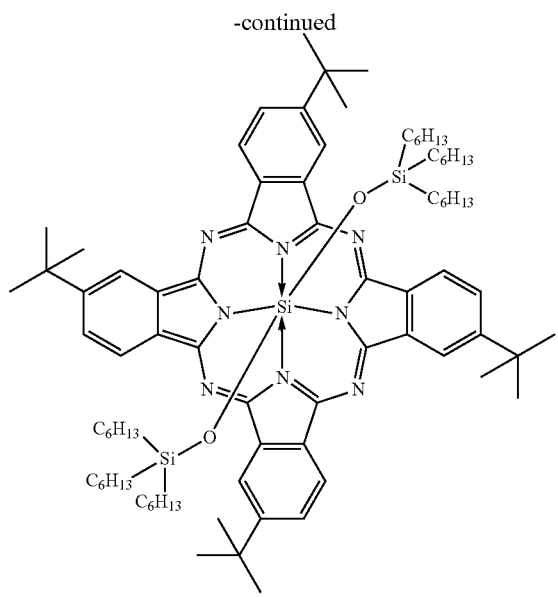

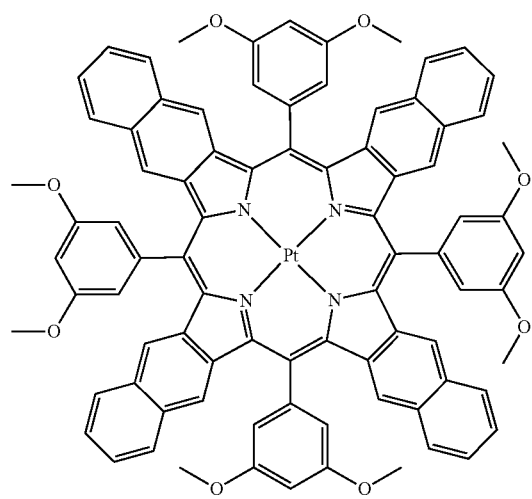

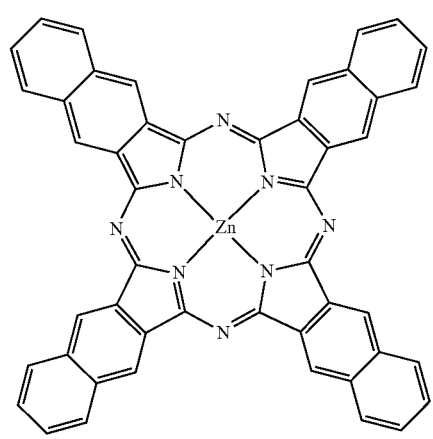

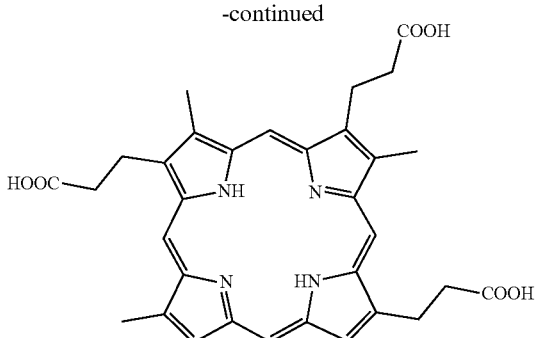

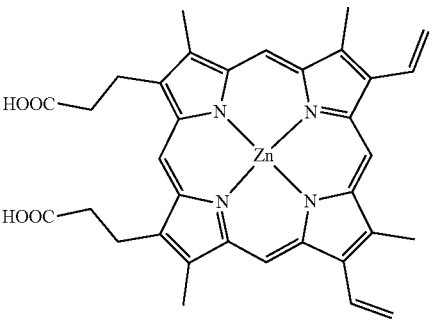

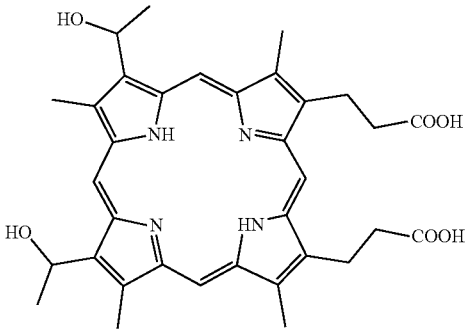

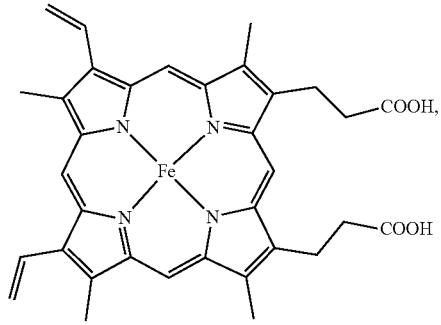

and graphene quantum dots, carbon quantum dots, CdSe quantum dots and PbS quantum dots, and the like.

(2) Luminescent Agent

Preferably, the luminescent agent may be selected from iridium complexes, rare-earth complexes, polyfluorene compounds, coumarin compounds, naphthalimide compounds, triacene or higher acene compounds, rhodamine compounds, fluorescein compounds, dipyrromethene boron difluoride compounds (BODIPY), resorufin compounds, pyrazoline compounds, triphenylamine compounds, carbazole compounds, green fluorescent protein, Bimane compounds, perovskite luminescent nanomaterials, TADF compounds, and derivatives and copolymers of these compounds.

As the rhodamine compounds, for example, the following structures may be mentioned:

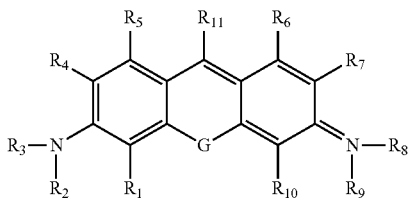

As the fluorescein compounds, for example, the following compounds may be mentioned:

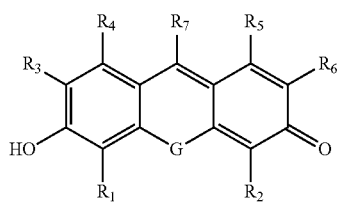

As the dipyrromethene boron difluoride compounds (BODIPY), for example, the following compounds may be mentioned:

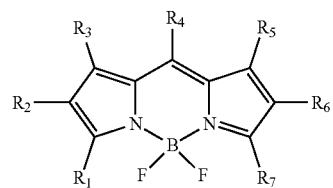

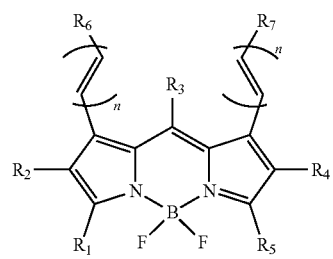

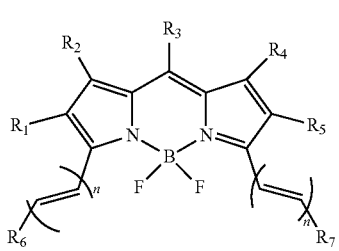

-continued

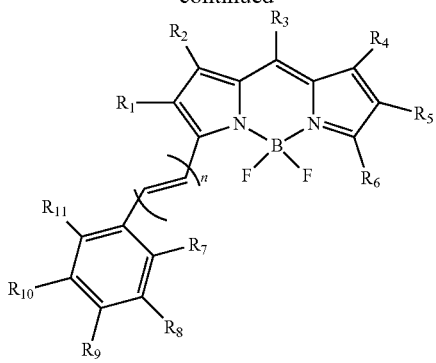

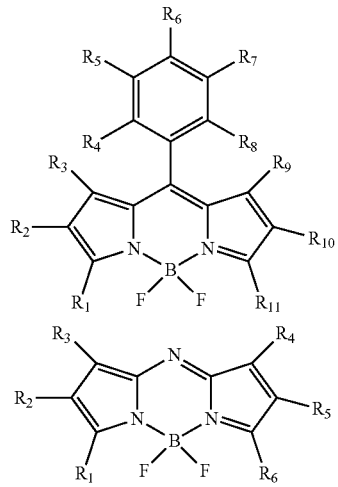

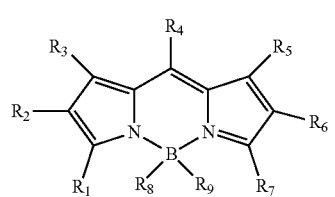

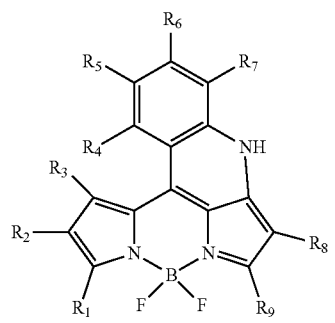

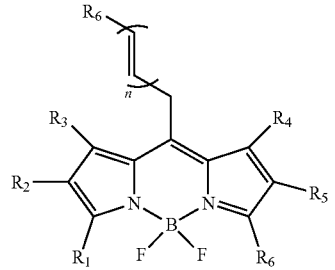

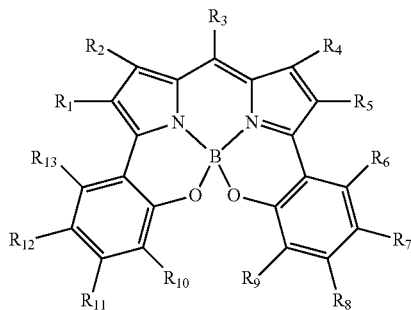
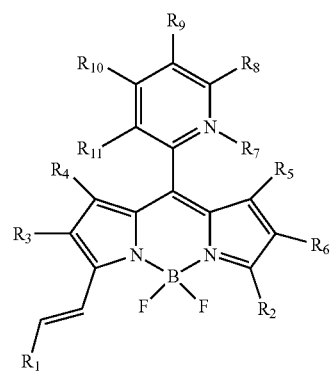
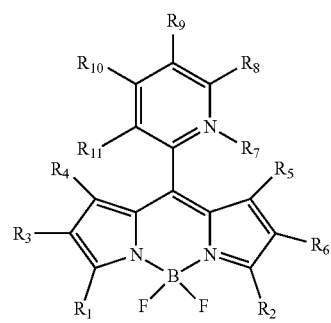
As the naphthalimide compounds, for example, the following compounds may be mentioned:
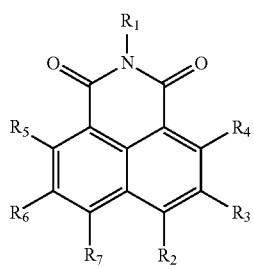
As the acene compounds, for example, the following compounds may be mentioned:
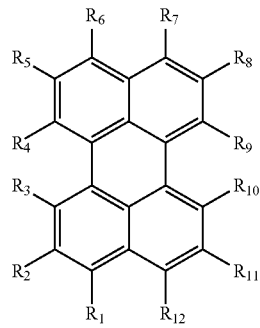
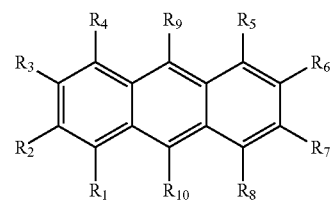
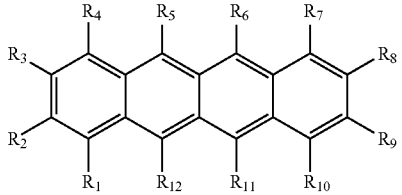
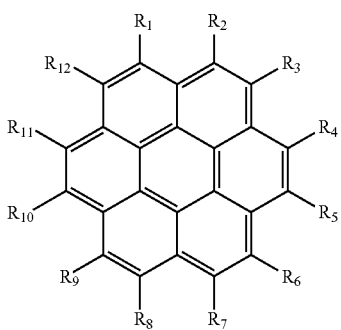
As the polyfluorene compounds, for example, the following compounds may be mentioned:
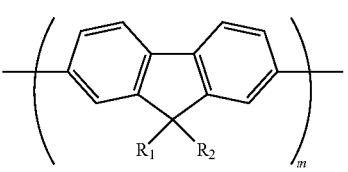

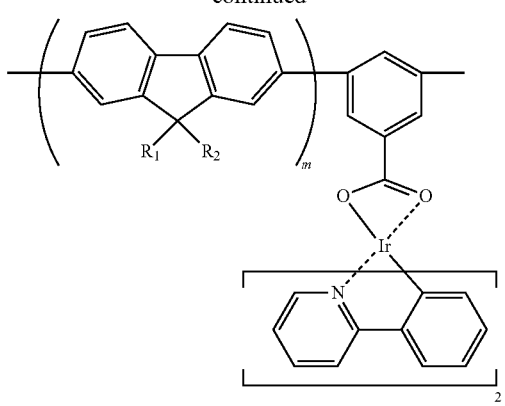

As the coumarin compounds, for example, the following may be mentioned:

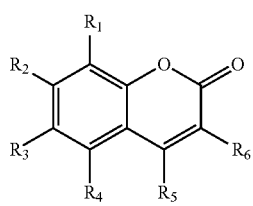

As the resorufin compounds, for example, the following may be mentioned:

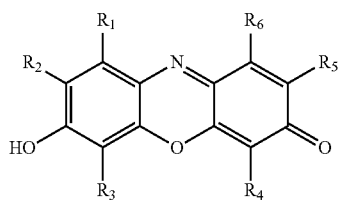

As the pyrazoline compounds, for example, the following may be mentioned:

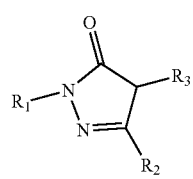

As the triphenylamine compounds, for example, the following may be mentioned:

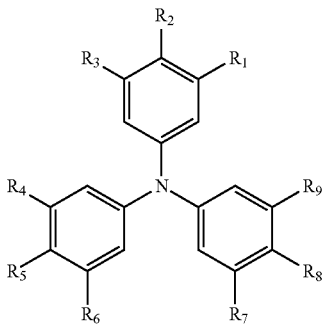

As the carbazole compounds, for example, the following may be mentioned:

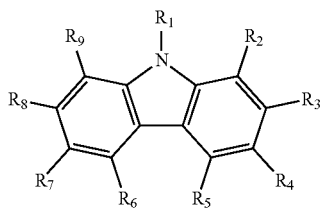

As the Bimane compounds, for example, the following may be mentioned:

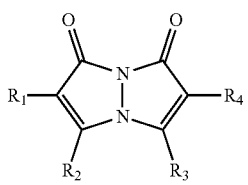

In structural formulae of these luminescent agent compounds shown above,
m=an integer from 50 to 1000, preferably from 100 to 5000, more preferably from 200 to 1000;
n=an integer greater than or equal to 0, such as 0, 1, 2 and 3; and
G and T are heteroatoms selected from, for example, O, Te, Si, P.

Each substituent R, for example $R_{1-13}$, represents H, hydroxyl, carboxyl, amino, mercapto, ester, an aldehyde group, nitro, sulfo, halogen, or alkyl having 1 to 50, preferably 1 to 24, for example 2 to 14 carbon atoms, alkenyl, alkynyl, aryl, heteroaryl with N, O, or S, alkoxy, alkylamino, or a combination thereof. In addition, any adjacent substituents R on a benzene ring in quinoxaline, benzothiazole and benzoxazine may form a condensed aromatic ring, preferably a benzene ring. Preferably, the R groups are selected from methoxy, ethoxy, dimethylamino, diethylamino, methyl, ethyl, propyl, butyl, tert-butyl, phenyl, or a combination thereof.

In addition, the luminescent agent further includes TADF compounds. These molecules are composed of a donor group and an acceptor group in the molecules. A donor and an acceptor are connected according to a certain rule to form a molecule with a fluorescence or phosphorescence emission ability. As the TADF compounds, please refer to the review paper by Zhiyong Yang et al. *Chem. Soc. Rev.* 2017, 46, 915-1016, the full text of the paper is incorporated into the present application here by reference. Some structures of the example are as follows:

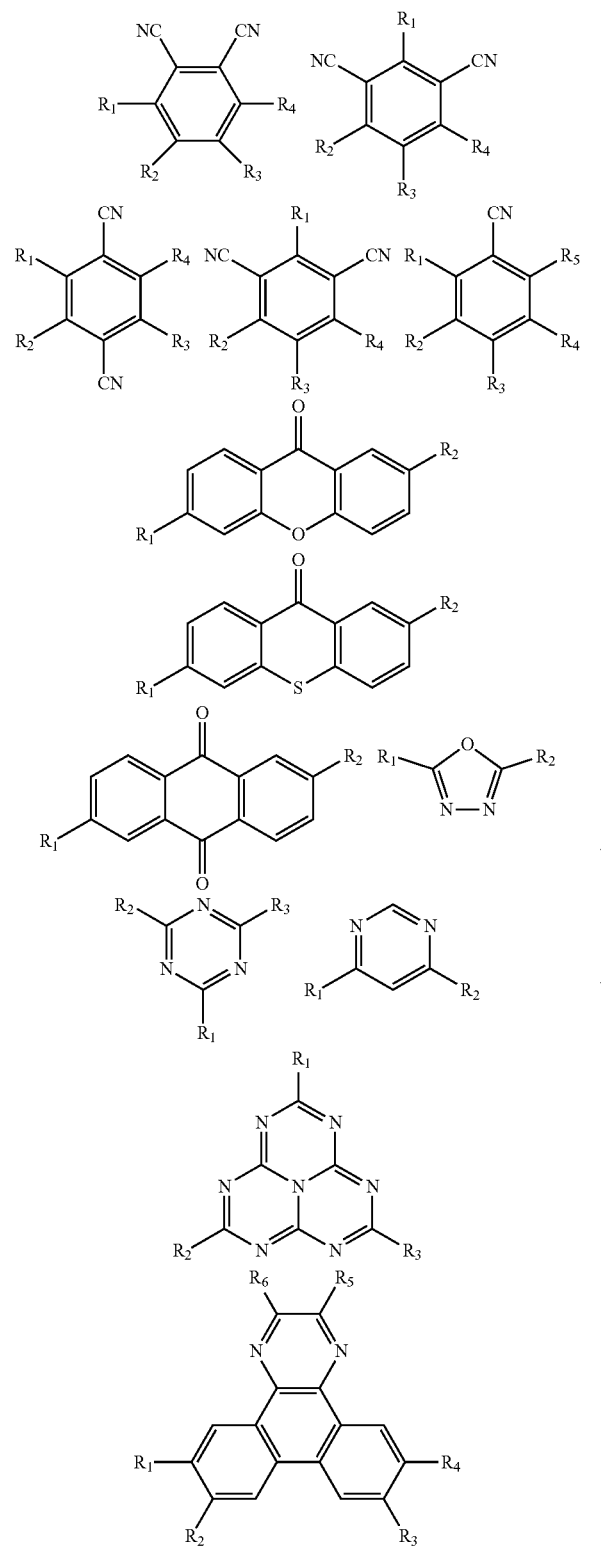

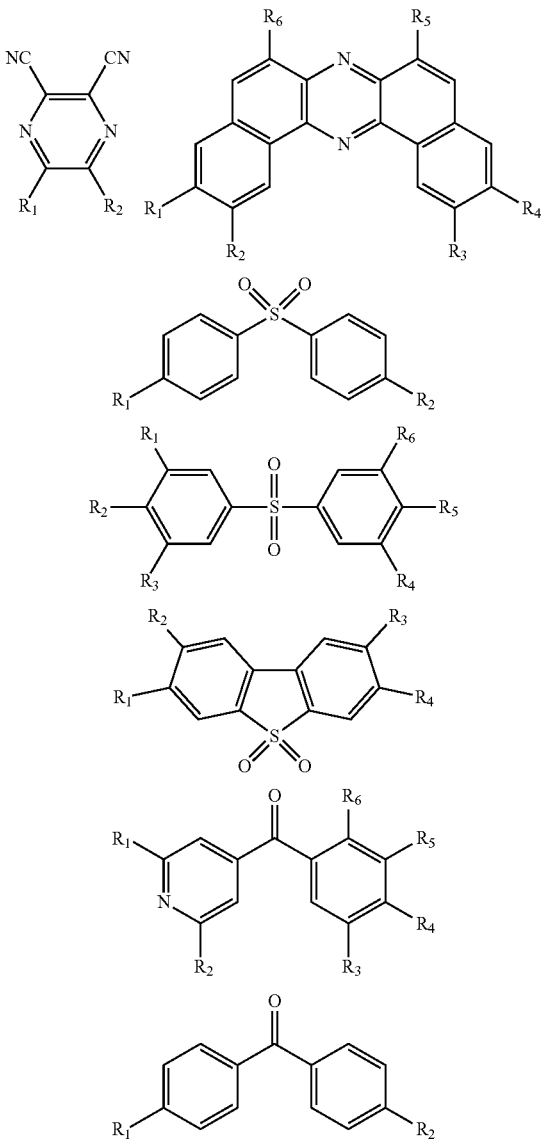

Each substituent R, for example $R_{1-6}$, represents H, hydroxyl, carboxyl, amino, mercapto, ester, an aldehyde group, nitro, sulfo, halogen, or alkyl having 1 to 50 carbon atoms, alkenyl, alkynyl, aryl, alkoxy, alkylamino, or a combination thereof. Preferably, the R groups are selected from alkane, olefin, alkyne, aryl, methoxy, ethoxy, dimethylamino, diethylamino, methyl, ethyl, propyl, butyl, tert-butyl, phenyl, or a combination thereof; and the TADF compounds contain the following groups:

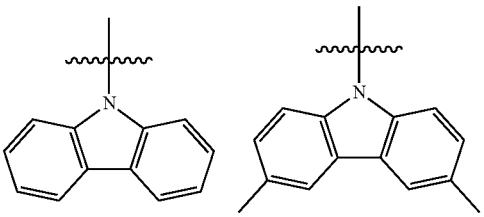

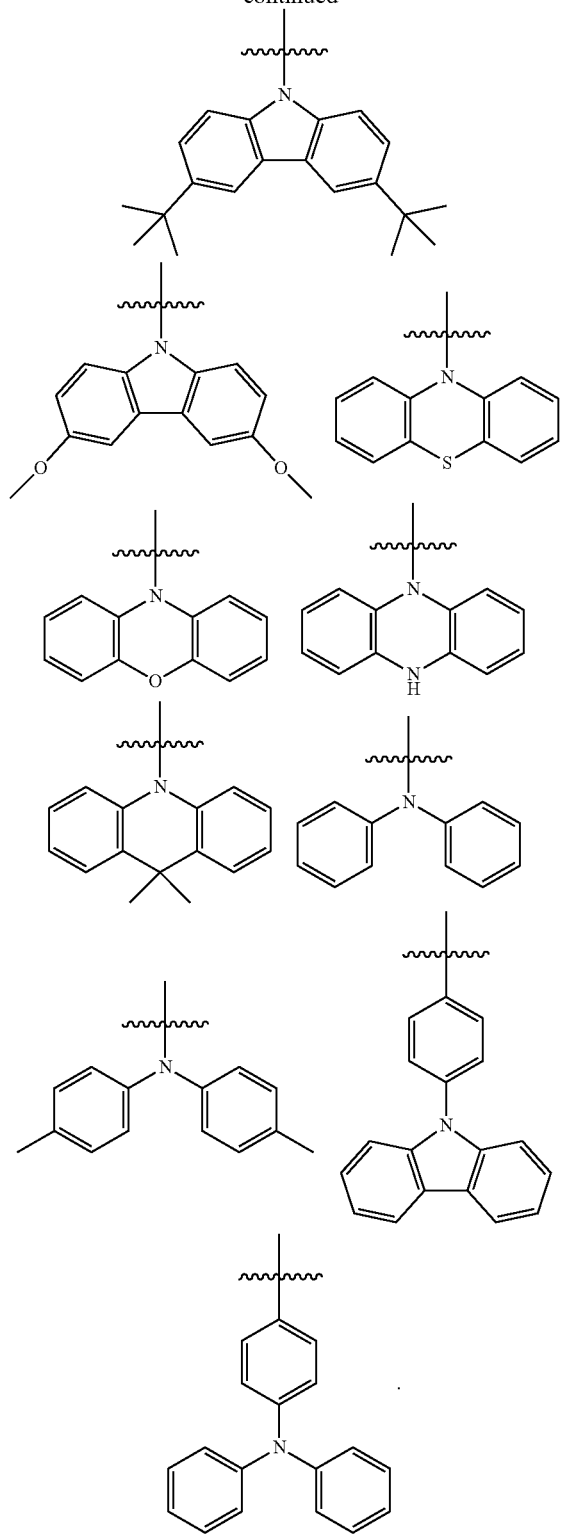

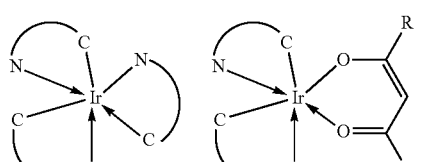

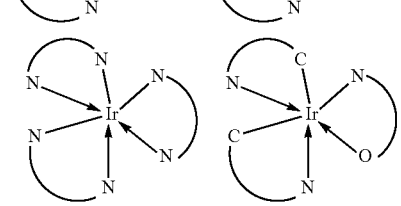

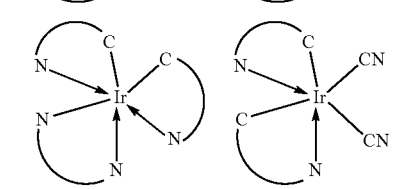

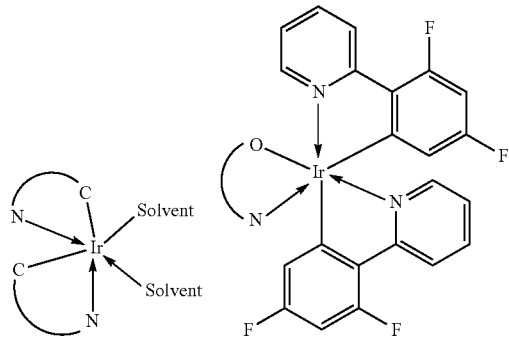

In addition, the luminescent agent may further be a metal complex, especially an Ir complex. A schematic structure of the iridium complex as a luminophor and the types of part of C—N, N—N, O—O and O—N ligands thereof are shown as following. In the iridium complex, the composition of the ligand may be a combination of one or more different ligands.

Wherein the C—N ligand may have, for example, the following structure:

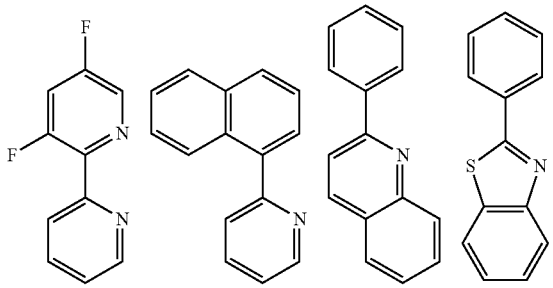

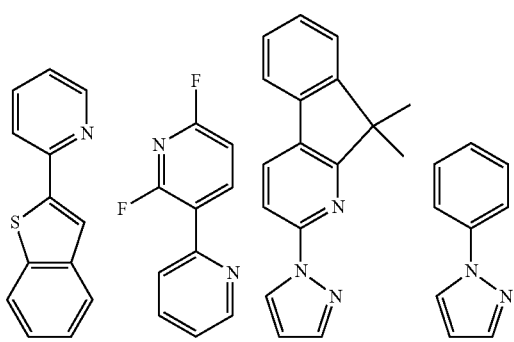

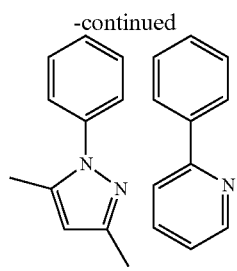

the O—N ligand may have, for example, the following structure:

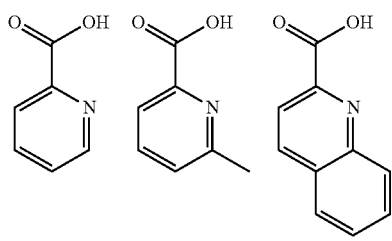

the N—N ligand may have, for example, the following structure:

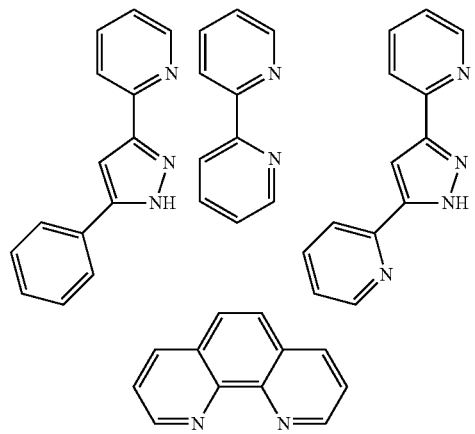

In addition, the following rare-earth complexes are also suitable as the luminescent agent of the present invention. A central atom in these complexes is a lanthanide element, and the ligand is coordinated with the central atom by O or N. Generally, the central atom is Eu, Tb, Sm, Yb, Nd, Dy, Er, Ho, Pr, etc. A coordination number of these rare-earth complexes is about 3 to 12, preferably 6 to 10. In actual rare-earth complexes, the type of the ligands, the number of each ligand and the total coordination number may vary. For the rare-earth complexes and the ligands thereof, please refer to the review paper by Yoshi Okamoto et al. *Chem. Rev.* 2002, 102, 2357-2368.

In one advantageous implementation, the luminescent agent may further be selected from a perovskite luminescent material. It may be a material with a perovskite structure ($YZX_3$), wherein the contained Y is a cation, Z is a cation, and X is an anion. Y preferably includes one or more of Cs, an ammonium salt, or an organic molecule containing amino. Z preferably includes one or more of Pb, Sn, Mn, and Fe. X preferably includes one or more of Cl, Br, I.

In one preferable implementation, the luminescent agent is selected from the above-mentioned iridium complexes, rare-earth complexes, conjugated polymer, coumarin compounds, naphthalimide compounds, acene compounds, rhodamine compounds, dipyrromethene boron difluoride compounds (BODIPY), green fluorescent protein, perovskite luminescent nanomaterials, TADF compounds, and derivatives and copolymers of these compounds.

In one more preferable implementation, the luminescent agent is selected form iridium complexes, rare-earth complexes, rhodamine compounds, dipyrromethene boron difluoride compounds (BODIPY), perylene, and derivatives and copolymers of these compounds. Representative and particularly preferred examples of the luminescent agent are shown as follows:

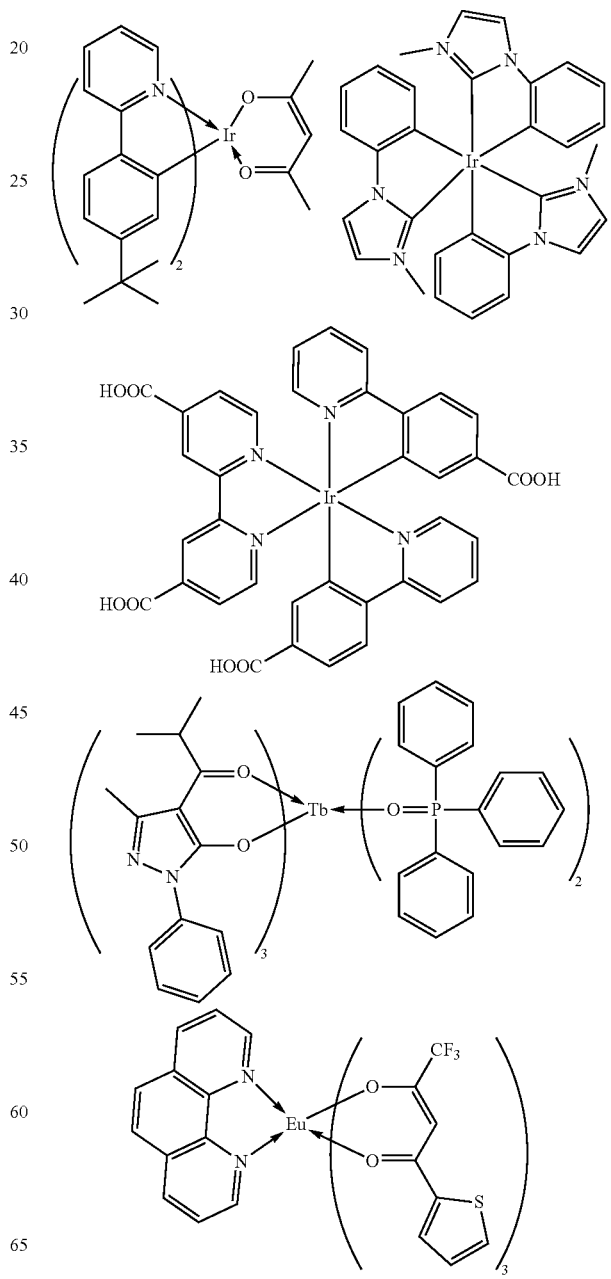

29
-continued
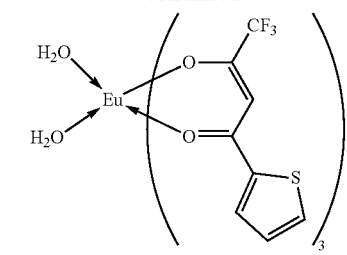
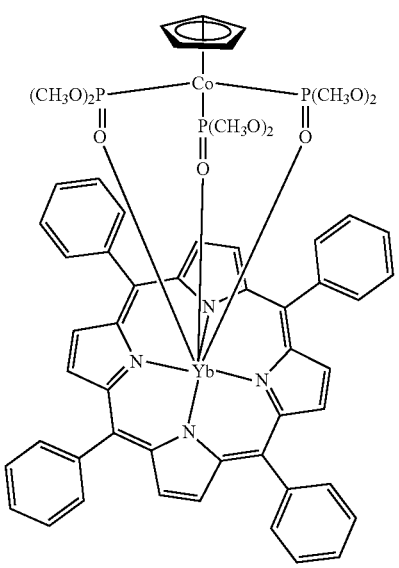
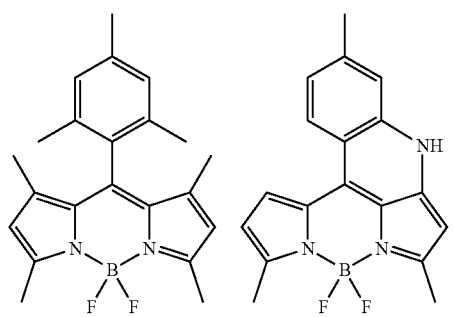
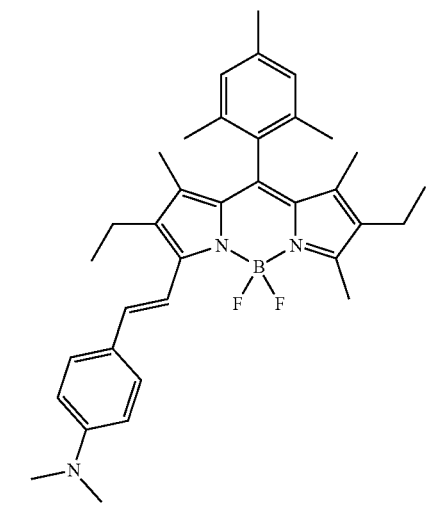
30
-continued
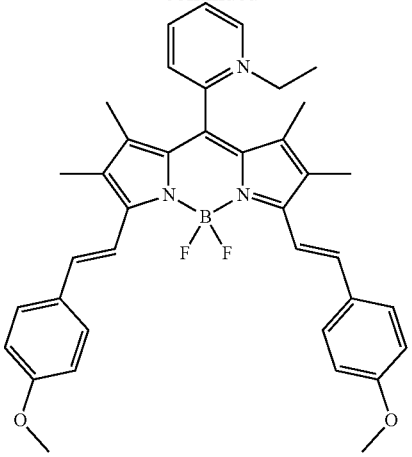
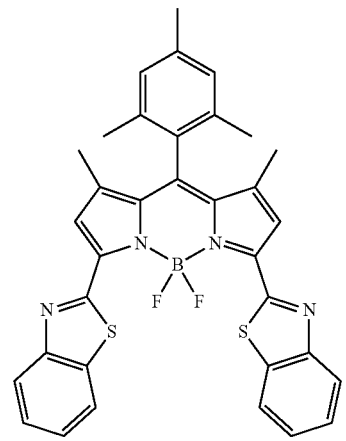
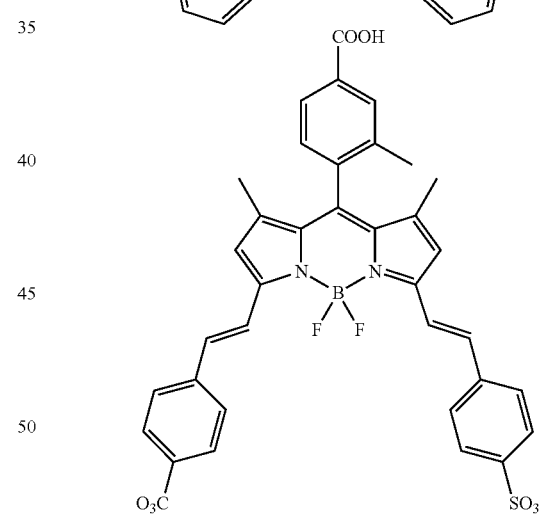
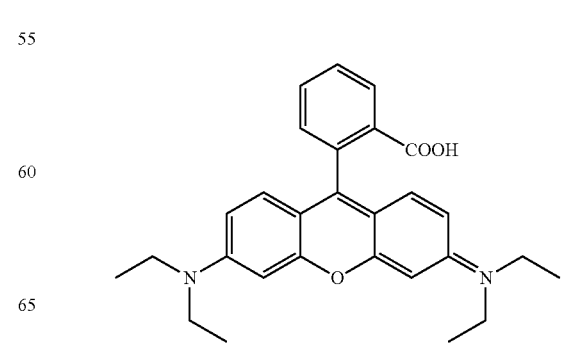

Photochemical Cache Agent

In the long-afterglow luminescent material according to the present invention, the photochemical cache agent (also named as "cache unit") is important. The photochemical cache agent screened according to the present invention can assist in participating in a photochemical reaction and build a bridge for energy exchange and storage between the luminescent agent and the light-absorbing agent. In the photochemical reaction, an energy extraction process of transition between energy levels is activated through reaction steps of addition, rearrangement or bond breaking.

The photochemical cache agent is generally compounds containing olefinic double bonds. The double bonds may be located inside or outside a ring, but are usually connected with groups with conjugated structures such as an aromatic ring, preferably a benzene ring. In addition, there are generally electron-donating groups in the structure connected with the double bonds, so that the double bonds are in an electron-rich state. The photochemical cache agent of the present invention is preferably a non-polymeric small molecule compound, and a molecular weight is preferably less than 2000, more preferably less than 1000. The non-polymeric compound means that the compound is non-polymerizable and is not obtained by a conventional polymerization reaction. Preferably, the compound does not contain or contains no more than 2 repeating units. In addition, the function of the photochemical cache agent is mainly conversion of photochemical energy. Different from the luminescent agent whose main function is to emit light, a cache agent molecule itself does not emit the light or emits the light very weakly, and its molecular structure generally does not contain a group that can directly emit the light. For relevant luminescent molecular groups, please refer to the review paper Nature Methods, 2005, 2, 910-919 by Jeff W. Lichtman et al. In particular, the photochemical cache agent according to the present invention is distinguished from the luminescent agent or the light-absorbing agent in kind, especially those luminescent agents or light-absorbing agents listed in the present invention.

In particular, the cache agent suitable for the present invention is selected from the following structural formulas (I), (II) and (III):

(I)

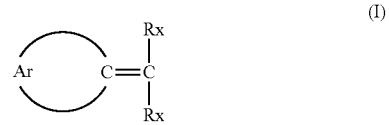

wherein part forms a divalent aromatic ring or a heteroaromatic ring having 5 to 24, preferably 6 to 14 ring carbon atoms, wherein one or more ring carbon atoms other than carbon atoms in a C=C bond connected with $R_x$ and $R_y$ may be replaced by a heteroatom selected from N, S, Se or O, and the aromatic ring or the heteroaromatic ring optionally has one or more substituents L, $R_x$ and $R_y$ are selected from H, hydroxyl, carboxyl, amino, mercapto, ester, nitro, sulfo, halogen, acylamino, or alkyl having 1 to 50, preferably 1 to 24, for example 2 to 14 carbon atoms, alkenyl, alkynyl, alkoxy, alkylthio, alkylamino, aryl, aralkyl, heteroaryl with N, O, or S or heteroaryl alkyl, or a combination thereof, wherein aryl, aralkyl, heteroaryl or heteroaryl alkyl optionally have one or more substituents L; or $R_x$ and $R_y$ together form alkylene or alkenylene having 2 to 20, preferably 3 to 15 C atoms, and optionally having one or more substituents L; and L is selected from hydroxyl, carboxyl, amino, mercapto, ester, nitro, sulfo, halogen, acylamino, or alkyl having 1 to 50, preferably 1 to 24, for example 2 to 14 or 6 to 12 carbon atoms, alkenyl, alkynyl, alkoxy, alkylamino, or a combination thereof.

(2)

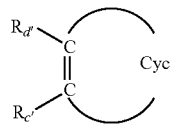
(II)

wherein

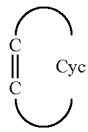

part represents phenyl substituted or unsubstituted by one or more L or represents a heterocyclic ring formed by replacing one or more ring carbon atoms other than carbon atoms connected with groups $R_{c'}$ and $R_{d'}$ in a five-membered or six-membered olefinic unsaturated carbocyclic ring with N, S, Se, or O, wherein the heterocyclic ring is only allowed to be condensed with at most one phenyl substituted or unsubstituted by L and may be substituted by one or more groups L or one or more aryl or heteroaryl having 4 to 24, preferably 5 to 14, more preferably 6 to 10 ring carbon atoms, $R_{c'}$ and $R_{d'}$ each independently has the definition given for $R_x$ and $R_y$ in formula (I), but not together form a divalent group, and at least one of $R_{c'}$ and $R_{d'}$ is the mentioned aryl or heteroaryl, or $R_{c'}$ and $R_{d'}$ together form a divalent group —C(=O)—NH—NH—C(=O)—, optionally substituted by L; and L is as defined in formula (I);

The premise is that when the

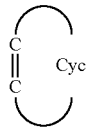

part is the phenyl substituted or unsubstituted by one or more L, then the groups $R_{c'}$ and $R_{d'}$ together form a divalent group —C(=O)—NH—NH—C(=O)—, optionally substituted by L.

(3) Ar—$CR_a$=$CR_bR_c$ (III)

wherein

Ar represents aryl or heteroaryl having 5 to 24, preferably 6 to 14 ring carbon atoms, wherein one or more ring carbon atoms may be replaced by heteroatoms selected from N, S, Se or O, preferably phenyl, and aryl or heteroaryl optionally has one or more substituents L;

$R_a$, $R_b$ and $R_c$ each independently have the definitions given for $R_x$ and $R_y$ in formula (I), provided that at most one of $R_a$, $R_b$ and $R_c$ is H; and L is as defined in formula (I).

In the context of the present application, the term "carbocyclic ring" represents a ring composed only of carbon and hydrogen, including aliphatic and aromatic rings, such as cyclohexene, cyclopentene, and a benzene ring. One or more ring carbon atoms, such as —CH= or —CH₂—, on the carbocyclic ring are replaced by heteroatoms such as N, S, Se or O to form a so-called "heterocyclic ring". The mentioned "carbocyclic ring" or "heterocyclic ring" preferably has 4 to 20, more preferably 5 to 14, for example 6 to 10 carbon atoms.

In the context of the present application, "aryl" or "aromatic ring" represents a group or ring formed by an aromatic compound that is distinguished from an aliphatic compound, which are directly connected with another structural group or condensed with another ring structure through one or more single bonds, so it is distinguished from groups such as "aralkyl" or "aryloxy" or "aryl ester", connected with another structural group through spacers such as alkylene or ester. Similarly, it also applies to "heteroaryl" or "heteroaromatic ring", which can be regarded as groups formed by replacing the ring carbon atoms on aryl or the aromatic ring with heteroatoms N, S, Se or O or replacing the carbon atoms on an aliphatic ring such as a cycloalkene with the heteroatoms. In addition, if there is no indication to the contrary, the mentioned "aryl" or "heteroaryl" further includes aryl or heteroaryl substituted or condensed with aryl and heteroaryl, for example, biphenyl, a phenylthiophene group or benzothiazolyl. In addition, "aryl" or "heteroaryl" may further include groups formed by aromatic or heteroaromatic compounds having functional groups such as ether or carbonyl, such as anthrone, diphenyl ether, or thiazolone. Advantageously, the "aryl/ring" or "heteroaryl/ring" according to the present invention has 4 to 30, more preferably 5 to 24, for example 6 to 14 or 6 to 10 carbon atoms. The term "condensed" means that two aromatic rings or heteroaromatic rings have a common edge.

In the context of the present application, the term "alkyl", "alkoxy" or "alkylthio" refers to linear, branched, or cyclic saturated aliphatic hydrocarbyl, which is connected with other groups through a single bond, an oxy group, or a sulfur group, and preferably has 1 to 50, more preferably 1 to 24, for example 1 to 18 carbon atoms. The term "alkenyl" or "alkynyl" refers to linear, branched or cyclic unsaturated aliphatic hydrocarbyl having one or more C—C double bonds or triple bonds, and preferably having 2 to 50, more preferably 2 to 24, for example 4 to 18 carbon atoms.

In the context of the present application, the term "alkylamino" refers to one or more alkyl-substituted amino, including monoalkylamino or dialkylamino, for example methylamino, dimethylamino, and diethylamino.

In the context of the present application, the term "halogen" includes fluorine, chlorine, bromine and iodine.

In addition, in the context of the present application, the optional groups in the definitions of the various substituents listed can be combined with each other to form a new substituent that conforms to the principle of valence bond, which means that, for example, C1-C6 alkyl ester vinyl ($C_{1-6}$alkyl-O—C(=O)—C=C—) which is formed by mutually combining alkyl, ester, and vinyl is also in the definition of relevant substituent.

In the preferred implementation of formula (I):

part is an acridine ring or an anthracene ring substituted or unsubstituted by the group L;

$R_x$ and $R_y$ are mutually independently selected from alkyl having 1 to 18, preferably 2 to 12 carbon atoms, alkoxy, alkylthio (alkyl-S—), alkylamino or aryls, or a combination thereof, or preferably together form alkylene having 2 to 20, preferably 3 to 15 C atoms, and optionally having one or more substituents L; more preferably, the groups $R_x$ and $R_y$ are mutually independently selected from alkyl having 1 to 8 carbon atoms, alkoxy, alkylthio, sulfo alkoxy, sulfo alkylthio, phenyl or alkylene having 3 to 12 C atoms, such as sub-adamantylene;

L is selected from hydroxyl, sulfo, linear or branched alkyl having 1 to 12, more preferably 1 to 6 carbon atoms, alkoxy, alkylamino, amino, or a combination thereof.

aryl is preferably phenyl, biphenyl or naphthyl substituted or unsubstituted by one or more L, and more preferably phenyl or naphthyl.

In the implementation of formula (II):

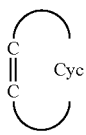

part advantageously contains an aromatic ring or a heteroaromatic ring that is not condensed. More preferably, the

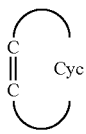

part is a thiophene ring, a phenylthiophene ring, a benzene ring, a naphthalene ring,

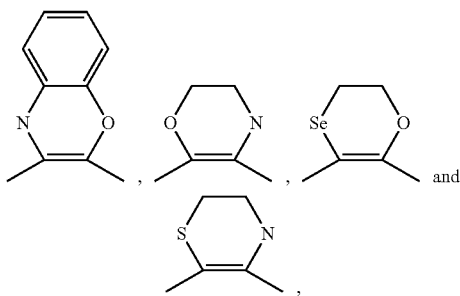

substituted or unsubstituted by one or more groups L, or a combination thereof;

$R_{c'}$ and $R_{d'}$ are each independently selected from alkyl having 1 to 18, preferably 1 to 12 carbon atoms, alkoxy, alkylamino or aryl, or a combination thereof, wherein aryl may be substituted by one or more groups L and preferably phenyl or naphthyl substituted or unsubstituted by one or more L; or when the

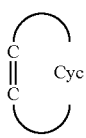

part is the phenyl substituted or unsubstituted by one or more L, then the groups $R_{c'}$ and $R_{d'}$ together form —CO—NH—NH—CO—; and/or L is selected from hydroxyl, sulfo, halogen, nitro, linear or branched alkyl having 1 to 12, more preferably 1 to 6 carbon atoms, alkoxy, alkylamino, amino, or a combination thereof.

In the implementation of formula (III):

$R_a$, $R_b$ and $R_c$ are each independently and preferably selected from H, hydroxyl, linear or branched alkyl having 1 to 18, preferably 1 to 12 carbon atoms, alkoxy, alkylamino or aryl such as phenyl, or a combination thereof.

Preferably, $R_b$ and $R_c$ together form alkylene having 2 to 20, preferably 3 to 15 C atoms, such as adamantylene;

L is selected from hydroxyl, sulfo, C1-C6 alkyl ester vinyl ($C_{1-6}$alkyl-O—C(=O)—C=C—), linear or branched alkyl having 1 to 12, more preferably 1 to 6 carbon atoms, alkoxy, alkylamino, or a combination thereof; and/or aryl is preferably phenyl or naphthyl substituted or unsubstituted by one or more L.

Further, the photochemical cache agent according to the present invention is specifically selected from one or more of the phenylthiophene compounds of the following formula (IV), the compound of the following formula (V), the acridine compounds of the following formula (VI), the compound of the following formula (VII), the compound of the following formula (VIII), the luminol compounds of the following formula (IX), the phenylimidazole compounds of the following formula (X), and the derivatives of these compounds:

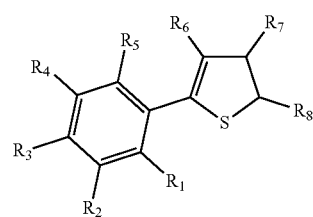

(IV)

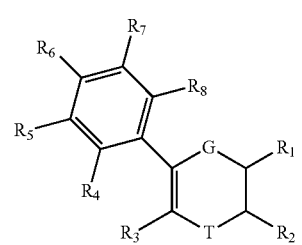

(V)

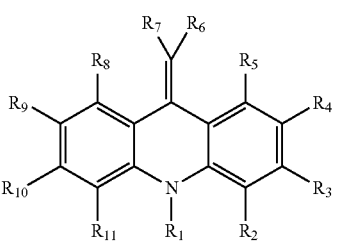

(VI)

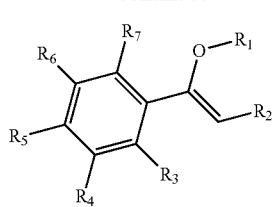

(VII)

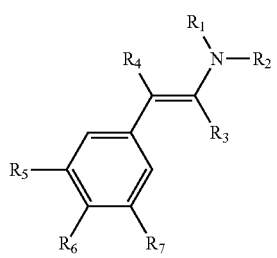

(VIII)

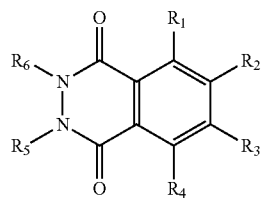

(IX)

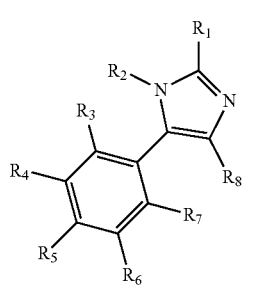

(X)

In the above preferred and exemplary structural formulae of the photochemical cache agent compounds from formulae (IV) to (X), G and T are a single bond, C or heteroatoms selected from O, S, Se and N, provided that G and T are not single bond or C at the same time;

groups $R_{1-11}$ represent H, hydroxyl, carboxyl, amino, mercapto, ester, nitro, sulfo, halogen, acylamino, or alkyl having 1 to 50, preferably 1 to 24, for example 2 to 14 carbon atoms, alkenyl, alkynyl, alkoxy, alkylthio, alkylamino, aryl, aralkyl, heteroaryl with N, O, or S or heteroaryl alkyl, or a combination thereof, wherein aryl, aralkyl, heteroaryl or heteroaryl alkyl optionally have one or more substituents L'; and L' is selected from hydroxyl, carboxyl, amino, mercapto, ester, nitro, sulfo, halogen, acylamino, or alkyl having 1 to 50, preferably 1 to 24, for example 2 to 14 or 6 to 12 carbon atoms, alkenyl, alkynyl, alkoxy, alkylamino, or a combination thereof.

Wherein, the above definitions related to $R_a$, $R_b$, $R_c$, $R_{c'}$, $R_d$, $R_x$, $R_y$ and L' and preferred definitions thereof also apply to the group $R_{1-11}$ and L in formula (IV) to (X).

More preferably, the groups $R_{1-11}$ are selected from methoxy, ethoxy, dimethylamino, diethylamino, methyl, ethyl, propyl, butyl, tert-butyl, phenyl, or a combination thereof.

In a particularly preferred implementation, the photochemical cache agent is selected from, for example, the following compounds:

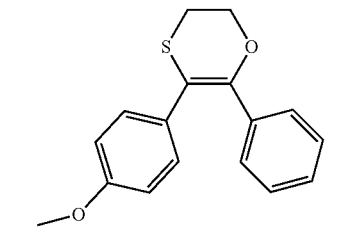

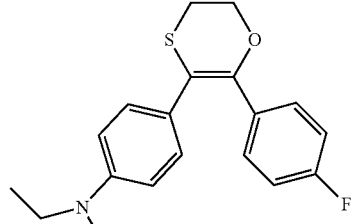

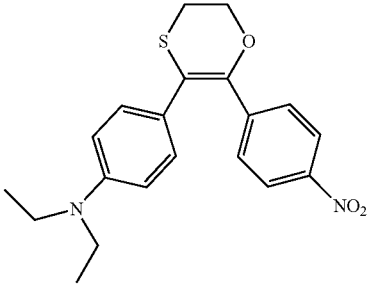

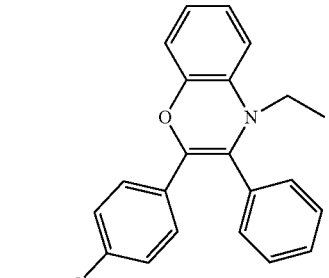

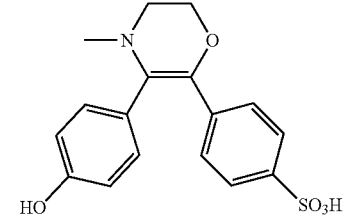

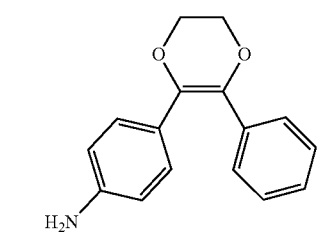

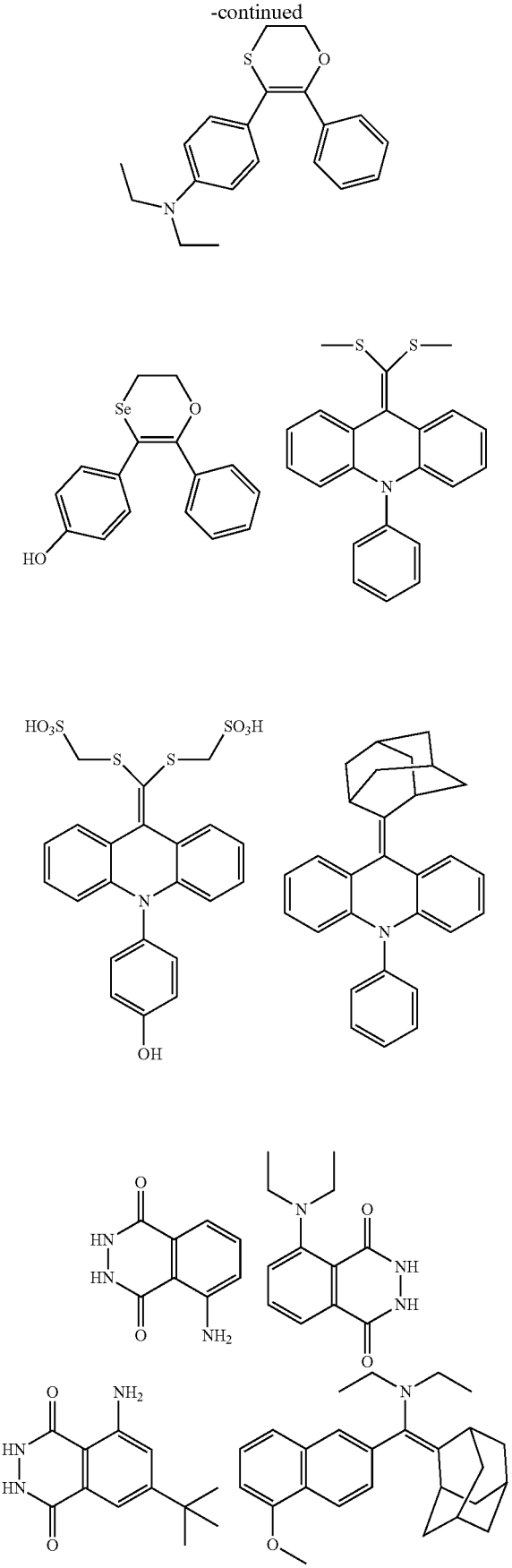

Other Components

In the long-afterglow material of the present invention, in addition to the above component A) light-absorbing agent, component B) luminescent agent and C) photochemical cache agent, the long-afterglow material may further contain other components, including processing aids, solvents and the like for processing the long-afterglow material into various forms, or components that further improve the long-afterglow luminescent effect.

In one preferred implementation, the long-afterglow material of the present invention may contain a photochemical storage agent component D).

Together with the aforementioned photochemical cache agent, the photochemical storage agent D) and the photochemical cache agent respectively perform the function of long-term storage and short-term buffer of photochemical energy. Both the photochemical storage agent and photochemical cache agent can participate in the photochemical reaction. A photochemical reaction product of the photochemical storage agent is relatively stable and can exist for a long time at room temperature, so it can perform the energy storage function, that is, the energy is stored for a long time. A photochemical product of the photochemical cache agent is unstable. After a short period of storage, the bond breaking and reorganization occur, and the energy conversion and extraction and transfer processes are realized at the same time. Therefore, the energy buffer function is exercised, that is, the energy is put into a buffer for standby application.

Different from the photochemical cache agent described above, the photochemical storage agent is generally selected from a compound containing a conjugated double bond, which is usually located in a ring.

In one preferred implementation, the photochemical storage agent may be selected from fullerene as shown in the following formula (XI) or surface-modified fullerene compounds, polyene oligomers, compounds shown in the following formulae (XII-1) to (XII-8) and derivatives of these compounds:

Fullerene-(R')z    (XI)

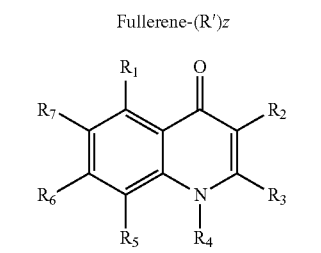
(XII-1)

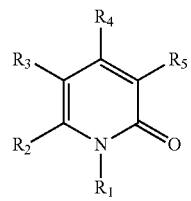
(XII-2)

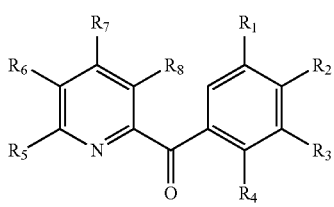
(XII-3)

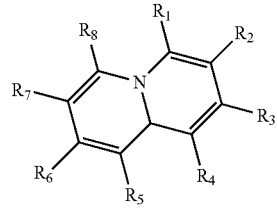
(XII-4)

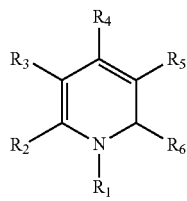
(XII-5)

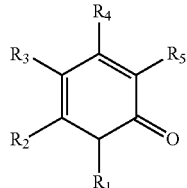
(XII-6)

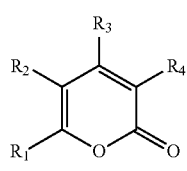
(XII-7)

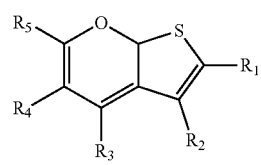
(XII-8)

In the above structures, each substituent R, for example, R' and $R_{1-11}$, represents H, hydroxyl, carboxyl, amino, mercapto, ester, an aldehyde group, nitro, sulfo, halogen, or alkyl having 1 to 50 carbon atoms, alkenyl, alkynyl, aryl, alkoxy, alkylamino, or a combination thereof. Preferably, the R groups are selected from alkane, olefin, alkyne, aryl, methoxy, ethoxy, dimethylamino, diethylamino, methyl, ethyl, propyl, butyl, tert-butyl, phenyl, or a combination thereof.

z represents an integer greater than 1.

In one advantageous implementation, the polyene oligomers include a C4-C30, preferably C4-C20 olefin oligomer having at least 2 olefinic unsaturated bonds, and its repeating unit is less than 100, more preferably less than 50.

In one more advantageous implementation, the exemplary and preferable photochemical storage agent includes, for example, the following compounds:

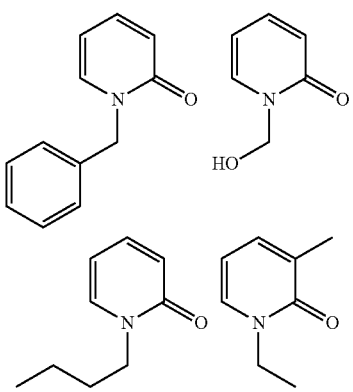

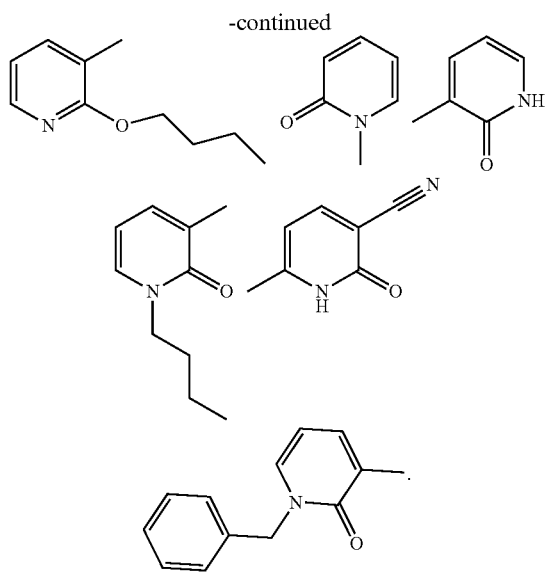

In addition, the long-afterglow material according to the present invention may further contain a carrier medium component E) for dissolving, dispersing or adsorbing components A) to C), preferably selected from an organic solvent, an aqueous phase solvent, a polymeric dispersion medium, a protein, phospholipid liposomes, and adsorptive particles. The carrier medium component E) may further be an organic molecular skeleton, on which other components are connected through chemical bonds. The carrier medium component E) depends on the nature and form of the long-afterglow material to be obtained.

The component E) may be an organic solvent, an aqueous phase medium, a polymer dispersion medium, a protein, phospholipid liposomes, etc., in which other components are physically dissolved or dispersely wrapped. Wherein the common organic solvents can be used as the medium of a long-afterglow luminescent system of the present invention. In a preferred solution, the organic solvent includes one or a mixture of more of the following: ① aromatic hydrocarbons: benzene, toluene, xylene, trimethylbenzene, benzyl alcohol, and the like; ② aliphatic hydrocarbons: pentane, hexane, octane, petroleum ether and the like; ③ alicyclic hydrocarbons: cyclohexane, cyclohexanone, toluene cyclohexanone and the like; ④ halogenated hydrocarbons: chlorobenzene, dichlorobenzene, dichloromethane, trichloromethane, tetrachloromethane and the like; ⑤ alcohols: methanol, ethanol, isopropanol, n-butanol, ethylene glycol, glycerin and the like; ⑥ ethers: diethyl ether, propylene oxide and the like; Testers: methyl acetate, ethyl acetate, propyl acetate, and the like; ⑧ketones: acetone, methyl butanone, methyl isobutyl ketone, and the like; ⑨glycol derivatives: ethylene glycol monomethyl ether, ethylene glycol monoethyl ether, ethylene glycol monobutyl ether, and the like; ⑩ Others: N, N-dimethylformamide, dimethyl sulfoxide, acetonitrile, pyridine, phenol, oleic acid, linoleic acid, linolenic acid, octadecene, oleylamine, liquid paraffin, and the like. Advantageously, the number of different solvent types contained in a mixed solvent is 1 to 100, and a volume ratio of each different solvent has a larger adjustable range, such as 0.01% to 100%.

The aqueous phase solvent is an important solvent in nature and may serve as the medium of the long-afterglow luminescent system according to the present invention. In a preferred solution, the aqueous phase medium includes purified water, mineral water, distilled water, deionized water, soda water, river and lake water, sea water, a sufficiently dissoluble water body, serum plasma blood containing salt or protein, water vapor, and the like. In the aqueous phase medium, the number of types containing different dissolved substances may be 0 to 100, wherein the mass percentage of water is 0.01% to 100%.

The polymeric dispersion medium is an important matrix in nature, and may also serve as a carrier medium of the long-afterglow luminescent system based on a photochemical mechanism. In a preferred solution, the polymeric dispersion matrix includes macromolecular materials such as plastic, rubber, and fibers. The plastic includes two major categories of thermoplastic (such as polyethylene, polystyrene, polyvinyl chloride, etc.) and thermosetting plastic (such as phenolic resin, epoxy resin, unsaturated polyester resin, etc.). The former is macromolecules of a linear structure, which can be softened and flow when heated, and can be repeatedly plasticized and molded. Inferior products and waste products can be recycled and reprocessed into products. The latter is macromolecules of a body structure, which solidifies once it is molded, and cannot be softened by heating, and cannot be repeatedly processed and molded. The common characteristic of plastic is that the plastic has good mechanical strength (especially the macromolecules of the body structure) and is used as a structural material. The fibers include natural fibers and chemical fibers, wherein the chemical fibers include man-made fibers (such as viscose fibers, acetate fibers, etc.) and synthetic fibers (such as nylon, polyester, etc.). The man-made fibers are made of natural macromolecules (such as short lint, bamboo, wood, hair, etc.) through chemical processing and spinning, and the synthetic fibers are synthesized from low-molecular-weight raw materials. The fibers have the characteristics of being capable of being molded by spinning, good in strength and flexibility, and capable of being used as a textile material. The rubber includes natural rubber and synthetic rubber. The rubber has the characteristics of being good in high elasticity and capable of being used as an elastic material. The polymer dispersion medium may have different chain segment structures and functional properties, and a wide molecular weight range such as 1000 to 1000000 Da.

The protein may also serve as a carrier medium of the long-afterglow luminescent system based on the photochemical mechanism. In a preferred solution, the protein includes casein and lactalbumin in milk, ovalbumin and lecithoprotein in eggs, albumin and muscle protein in meat, soy protein in soybeans, gluten and gliadin in wheat, glutelin and zein in corn, legumin in pea, glial protein in connective tissue and skin of animals, hemoglobin and serum albumin in blood, etc. The protein may have different appearance structures and functional properties, and a wide molecular weight range such as 1 KDa to 3000 KDa.

The component E) may further be an organic molecular skeleton, on which other components are connected through chemical bonds. In a preferred solution, the skeleton structure includes organic carbon chains, a carbon cage, graphene, carbon nanotubes, an oligomeric macromolecular chain segment, a phospholipid bilayer, and the like. A chemical bond connection mode is a coordination bond, a covalent bond, etc., for example, molecules are connected to the organic skeleton through the action of amino and carboxyl functional groups. The organic skeleton may have various functional group connection sites, and a wide molecular weight change range, such as 50 to 50000 Da, and the number of the connection sites may be, for example, 3 to 1000.

The component E) may further be adsorption particles, on which other components are adsorbed. In a preferred solution, the particle carrier includes latex particles, silicon balls, carbon tubes, metal particles, magnetic particles, transition metal oxide or sulfide particles, polymer particles, quantum dots, and the like. The size of the nanoparticles may range from about 1 nm to 1 mm. Preferably, the component E) may be nanoparticles, the size of which may range from about 1 nm to 1000 nm. In a preferred solution, the nanoparticle carrier includes latex nanospheres, silicon nanospheres, carbon nanotubes, gold nanoparticles, magnetic nanoparticles, transition metal oxide or sulfide nanoparticles, polymer nanospheres, quantum dots, and the like. As mentioned above, the particles may be organic or inorganic, expandable or non-expandable, porous or non-porous. The particles preferably have a density close to that of water, generally about 0.7 g mL-1 to about 1.5 g mL-1, and contain transparent, partially transparent or opaque materials.

The component E) may also be biological materials, such as animals, plants and microorganisms, organelles, blood vessels, trachea, ducts, sieve tubes, skin, valves, red blood cells, white blood cells, lymphocytes, hybridomas, streptococcus, Staphylococcus aureus, *Escherichia coli* (*E. coli*), viruses, chloroplasts, cell membranes, cell walls, liposomes, phospholipid vesicles, chylomicron, lipoproteins, etc.

Advantageously, the long-afterglow luminescent system according to the present invention has a solid or liquid appearance, preferably a liquid or a polymer film. In a preferred solution, the components A), B), C) and optional D) in the long-afterglow material composition according to the present invention are uniformly mixed in the component E), especially an organic solvent, the carrier medium component E) is removed by heating and volatilization and other forms, so as to obtain the photochemical long-afterglow luminescent system that does not contain component E).

When the long-afterglow material composition according to the present invention contains the carrier medium component E), in an advantageous implementation solution, the using amount range of the light-absorbing agent component A) may be 1 ng $g^{-1}$ to 100 mg $g^{-1}$, the using amount range of the photochemical cache agent component C) may be 1 μg $g^{-1}$ to 200 mg $g^{-1}$, and/or the using amount range of the luminescent agent component B) may be 1 μg $g^{-1}$ to 700 or 500 mg $g^{-1}$. In a more advantageous solution, the using amount range of the light-absorbing agent component A) may be 50 ng $g^{-1}$ to 50 mg $g^{-1}$, the using amount range of the photochemical cache agent component C) may be 50 μg $g^{-1}$ to 100 mg $g^{-1}$; and/or the using amount range of the luminescent component B) may be 50 μg $g^{-1}$ to 300 mg $g^{-1}$. In a preferred solution, the using amount range of the light-absorbing agent component A) may be 0.1 μg $g^{-1}$ to 10 mg $g^{-1}$, the using amount range of photochemical cache agent component C) may be 100 μg $g^{-1}$ to 20 mg $g^{-1}$, and/or the using amount range of the luminescent agent component B) may be 50 μg $g^{-1}$ to 100 mg $g^{-1}$. In a more preferred solution, the using amount range of the light-absorbing agent component A) may be 0.5 μg $g^{-1}$ to 5 mg $g^{-1}$. The using amount range of the photochemical cache agent component C) may be 150 μg $g^{-1}$ to 10 mg $g^{-1}$, and/or the using amount range of the luminescent agent component B) may be 100 μg $g^{-1}$ to 50 mg $g^{-1}$. In illustration related to the using amount throughout the present application, the description of relative mass concentration is used. For example, "the using amount of the component B) is 1 ng $g^{-1}$" means: in 1 g of the carrier medium component E), the using amount of the component B) is 1 ng. Moreover, the above using amount ranges of the respective components are only illustrative, and therefore can be combined arbitrarily.

In addition, in the long-afterglow material composition according to the present invention, the long-afterglow effect can be further improved by adjusting the molar ratio of the light-absorbing agent to the luminescent agent within an appropriate range. In one advantageous implementation, the molar ratio of the light-absorbing agent to the luminescent agent is 1:1.1 to 1:10000, preferably 1:10 to 1:8000 or 1:50 to 1:6000, more preferably 1:100 to 1:4000 or 1:200 to 1:2000. In addition, in one advantageous implementation, the long-afterglow material of the present invention comprises, for example, more than 0.01% by weight of a photochemical storage agent based on the total weight of components A) to D). In one advantageous implementation, the content of the photochemical cache agent, by total mass of the three components of the components A) to C) and optionally D), may be 0.1% to 80%, preferably 0.3% to 60%, more preferably 0.5% to 40%, most preferably 1% to 20%. In addition, in one advantageous implementation, the long-afterglow material of the present invention consists of the above components A) to C), the optional component D) and the optional component E).

When the ratio of the light-absorbing agent is too high, the adverse effect that the long-afterglow luminescence is absorbed by the light-absorbing agent and weakened will be generated. When the ratio of the light-absorbing agent is too low, the absorbed excitation light energy is relatively limited, which will also result in weaker long-afterglow luminescence. In addition, when the photochemical cache agent is too small, the energy cache capacity is weak, resulting in the adverse effect on the performance of the long-afterglow luminescence, for example, affecting the stability and luminescent brightness of the long-afterglow luminescence. When the too much cache agent is added in the system, collisional energy transfer between all the components will be hindered, and the buffered energy cannot be effectively transmitted out and is dissipated, which reduces the long-afterglow luminescent performance.

According to the above carrier medium and the different properties of all the components, the long-afterglow luminescent material according to the present invention may exist in the states or forms of crystal, nanoparticle, powder, film, block, metal-organic framework, composite, organic solvent system, ionic liquid, aqueous solution, aerosol dust, and gel sol, and meanwhile, the efficient long-afterglow luminescence can be realized under these forms or states.

The long-afterglow luminescent material of the present invention, due to the unrestricted flexibility in form and morphology, can realize change from a microscopic small scale to a macroscopic large scale in the material structure. The size of the form can be freely selected according to requirements, and the processing modes are diverse and unlimited, so that a preparation process of the long-afterglow luminescent material is simple and diverse, and at the same time, the material is endowed with excellent processing performance. For example, the long-afterglow material of the present invention can be processed directly from a solution, or serves as a raw material of nanostructures to be conveniently processed into target elements of any form and size.

The long-afterglow luminescent material of the present invention has a variety of environmental-friendly or bio-friendly forms in the effective existential state of the above various states or forms: a homogeneous aqueous solution, a microtube-encapsulated solution system, a water-dispersed nano-system, or a flexible polymer film.

According to the long-afterglow luminescent material of the present invention, the excitation and emission wavelengths of the system are easily regulated, and the spectral regions of violet, blue, green, yellow, red and near-infrared can be covered. The long-afterglow luminescence may be either the luminescence based on the up-conversion mechanism, the luminescence based on a down-conversion mechanism, or the luminescence without Stokes shift. By selecting the type of the light-absorbing agent and appropriate structural modification as necessary, the absorption wavelength range of the light-absorbing agent may cover 200 nm to 2000 nm, and the excitation of the long-afterglow luminescent system based on the photochemical mechanism can be realized in this range. By selecting the type of the luminescent agent and appropriate structural modification as necessary, the luminescent wavelength range of the luminescent agent may cover about 300 nm to 1700 nm, and the emission of the long-afterglow luminescent system based on the photochemical mechanism can be realized in this range. Since the operable range of excitation and emission is very wide, the actual combination of excitation and emission properties is very rich. When light with a wave band of $\lambda 1$ (200 nm<$\lambda 1$<2000 nm) is used for excitation, the emitted light wave band $\lambda 2$ of long-afterglow luminescence is flexibly distributed (300 nm<$\lambda 1$<1700 nm), and the long-afterglow luminescence may cover from the ultraviolet visible wave bands to the near-infrared wave bands. When $\lambda 1 < \lambda 2$, shorter wavelength light is excited to achieve longer wavelength light emission, that is, the excitation light wavelength is red-shifted than the emitted light wavelength, which belongs to the conventional down-conversion luminescent mode; when $\lambda 1 > \lambda 2$, the longer wavelength light is excited to achieve shorter wavelength light emission, that is, the excitation light wavelength is blue-shifted than the emission light wavelength, which belongs to the up-conversion luminescent mode; and when $\lambda 1 = \lambda 2$, that is, the excitation light wavelength and the emission light wavelength are in the same wave band, which belongs to the luminescent mode without Stokes shift.

According to the long-afterglow luminescent material of the present invention, a luminescent process is highly controllable, on the one hand, the luminescent time of the luminescent material can be regulated, and on the other hand, the luminescent decay curve shape can also be regulated. In a preferred control strategy, an electromagnetic field, a pressure, a temperature, an air pressure, sound, light, humidity, a chemical reaction and the like can all be configured to regulate and control a long-afterglow luminescence decay curve. Among these control modes, part of the control modes can respond in an ultra-quick mode or instantaneously, part of the control modes can respond quickly, and part of the control modes have the characteristics of delayed response. The control progress has diversity, flexibility and arbitrariness, and the applied control modes can be managed programmatically according to specific needs. In a better strategy, a temperature regulating and control means is selected. The temperature regulating and control operation is simple and quick. As a result, various styles of decay curves can be realized. These shapes may be one or a combination of any shapes in linear, quadratic linear, stepped, smooth straight, wavy, and irregular jumping shapes.

According to the long-afterglow luminescent material of the present invention, the long-afterglow luminescent intensity can also be flexibly controlled on the basis of the above controllable luminescent color and time. For example, the long-afterglow luminescent intensity can be regulated by regulating and controlling the amount of input energy and the process of output energy. The luminescent intensity of the long-afterglow material according to the present invention can reach a level of commercialized inorganic long-afterglow powder $SrAl_2O_4$:$Eu^{2+}$, $Dy^{3+}$.

A variety of light sources can be used to excite and charge the long-afterglow luminescent material of the present invention. Common light source lighting equipment, point light sources, ring light sources, and indoor and outdoor natural lighting can all excite and charge the long-afterglow luminescent system based on the photochemical mechanism. In a preferred solution, these light sources include solid-state laser, gas laser, semiconductor laser, a photodiode, a D65 standard light source, an organic light-emitting diode, an ultraviolet lamp, an electric torch, a flashlight, an xenon lamp, a sodium lamp, a mercury lamp, a tungsten lamp, an incandescent lamp, a fluorescent lamp and natural sunlight, and combinations of these light sources. In a more preferred solution, the lasers and the light-emitting diodes are used as excitation light sources. Light output by these light sources is good in monochromaticity and high in luminescent brightness, and these light sources can selectively and rapidly excite and charge. In practical applications, the light emitted by the light sources may be a focused, divergent, circular, or collimated light beam. The light output intensity of the excitation light source may have a wide range of power density (1 $\mu W\ cm^{-2}$ to 1000 $W\ cm^{-2}$), and the excitation time also has a wide dynamic range (1 us to 1 h). In addition, the excitation light output by the light source may be continuous light, pulsed light or an output mode of a combination mode, wherein the pulsed light is modulated and has a wide modulation frequency range (0.001 Hz to 100 KHz).

In addition, in an application scenario, the long-afterglow luminescent material may be covered and wrapped by a colorless and transparent substance. At this time, the excitation light can directly irradiate and excite the long-afterglow luminescent material, and the excitation light is hardly affected by a blocking substance. In this case, the selection of the properties of the excitation light does not need to consider the properties of the blocking substance. However, in another application scenario, the long-afterglow luminescent material may be covered and wrapped by a colored and non-transparent substance. At this time, the blocking substance will absorb or scatter the excitation light, hinder the excitation light irradiation and excite the long-afterglow luminescent material. In this case, the selection of the properties of the excitation light needs to consider the properties of the blocking substance. For example, when the blocking substance is a colored substance, the wavelength of the excitation light should try to avoid an absorption light wave region of the colored substance. For example, when the blocking substance is biological tissue and other cases, the wavelength of the excitation light should be as long as possible, meanwhile, the intensity of the excitation light should not be too high. Thus the power density can be reduced or the pulsed light is used instead of the continuous light for irradiation to avoid the problems such as light or heat damage to the biological tissue.

The long-afterglow material of the present invention has broad application prospects based on the above unique and excellent properties. As a light source, luminescent technology and fluorescence regulation and controlling platform, applications in multiple fields can be realized. The main application includes up-conversion luminescence, biological imaging, surgical navigation, homogeneous detection, lateral chromatography, catalytic synthesis, the photochemical reaction, plant research, single particle tracing, luminescent probes, indication, display, anti-counterfeiting, information encryption, information storage, quantum teleportation, ultra-micro ranging and photochemical invisibility, etc.

EXAMPLE

1. Performance Test Method

Figure 1:
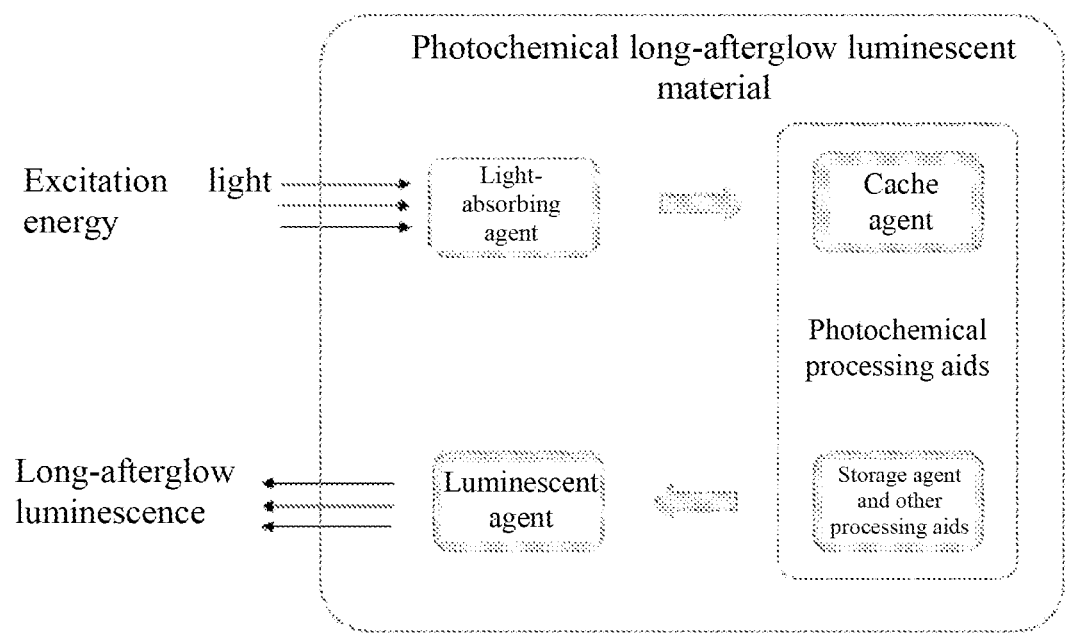
FIG. 1 is a schematic diagram of a photochemical long-afterglow luminescent material according to the present invention.
Figure 2:
FIG. 2 is a luminescent picture of a long-afterglow material, which is taken in the dark after excitation light is turned off. The left side is a material of Example 1 of the present invention, and the right side is a commercialized inorganic long-afterglow powder $SrAl_2O_4:Eu^{2+}, Dy^{3+}$ material.
Figure 3:
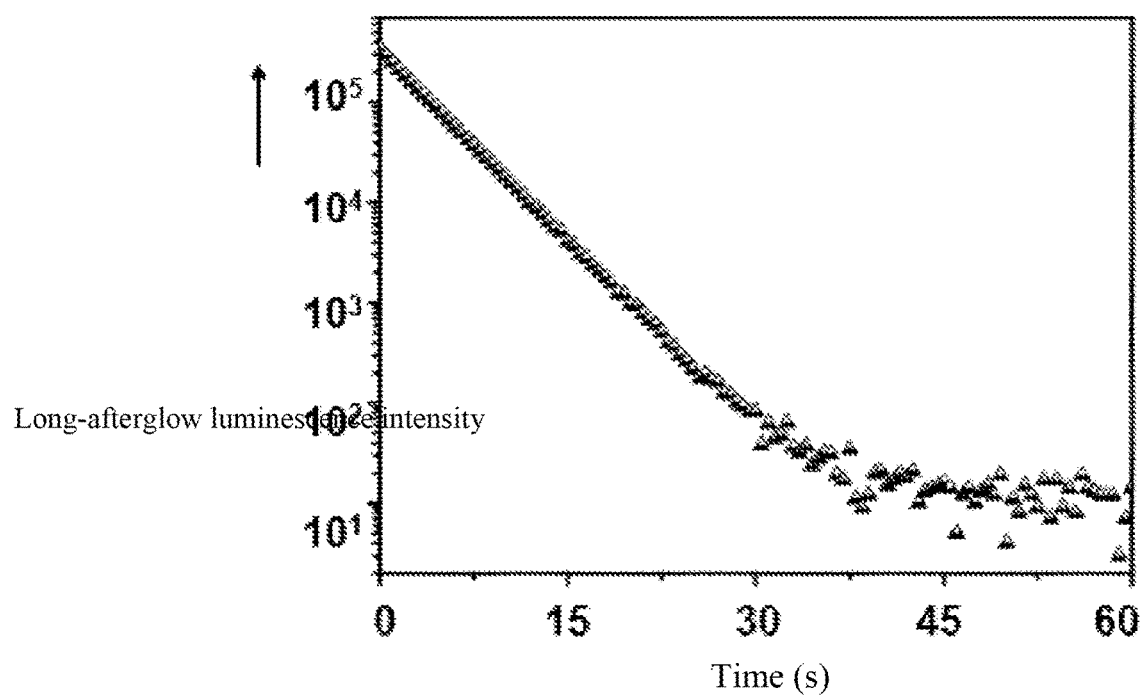
FIG. 3 is a luminescent decay curve of a long-afterglow material of Example 1.
Figure 4:
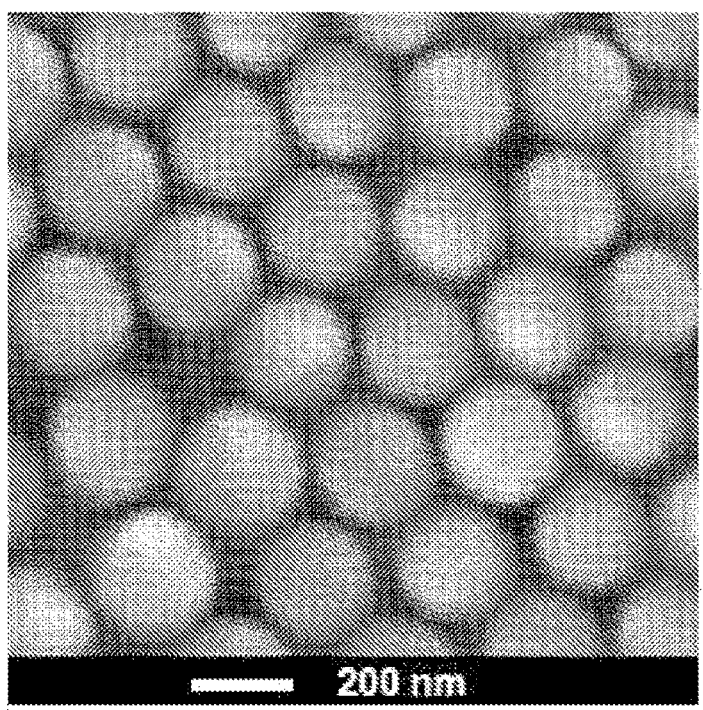
FIG. 4 is a transmission electron microscope of a long-afterglow luminescent nanomaterial of Example 15.
Figure 5:
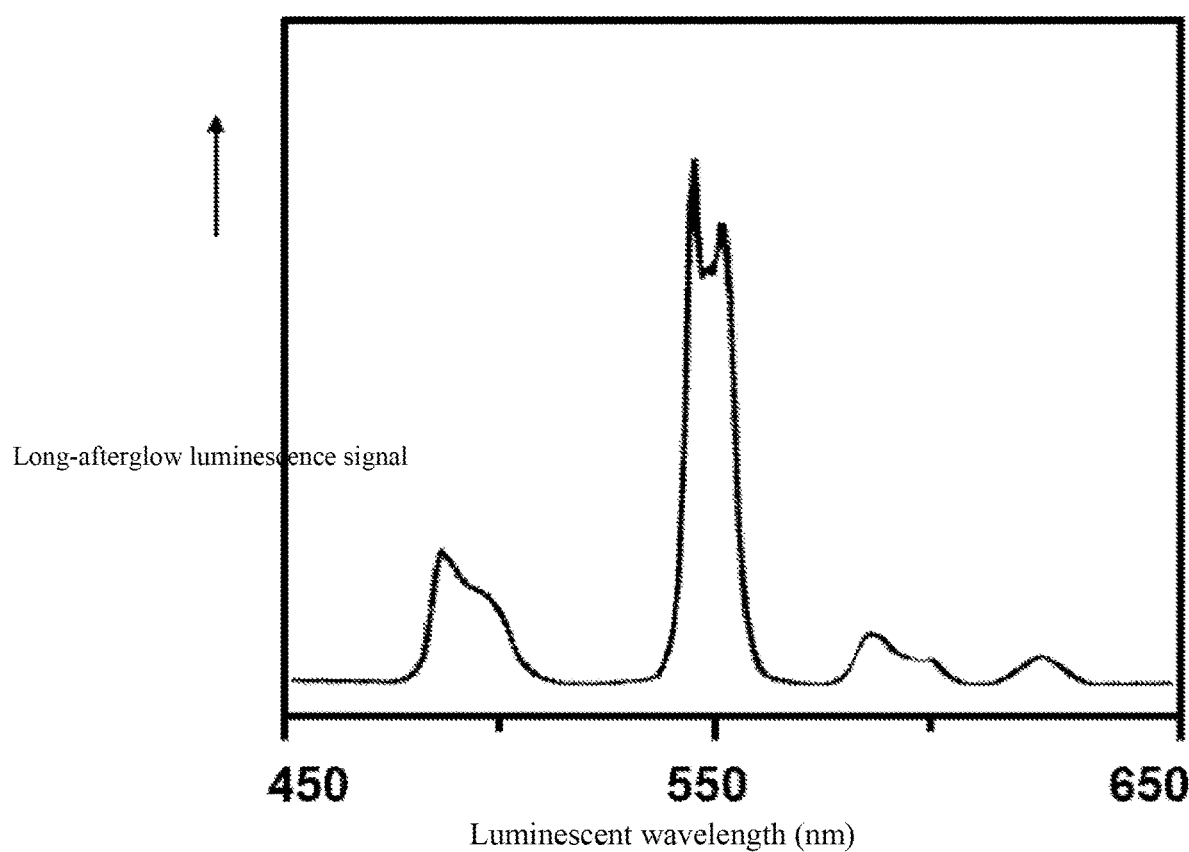
FIG. 5 is a luminescent spectrogram of a long-afterglow material of Example 16.

In a long-afterglow luminescent test of the present invention, professional instruments and equipment in the field were used. A wavelength tunable laser (Opolette 355) from Opotek, Inc., USA was used as excitation light source, and the power density of excitation light was maintained at 100 mW cm−2. Excitation light of a specific wavelength was used to irradiate a sample for charging, and the irradiating and charging time was 3 s. After charging, the laser was turned off, and the luminescent performance test was initiated. A fluorescence spectrometer (Edinburgh FLS-920) from Edinburgh Instruments was used to test the long-afterglow luminescent intensity, and the temperature was kept at a room temperature of 25 degrees Celsius. A long-afterglow test system (OPT-2003) of Beijing Aobodi Photoelectricity Technology Co., Ltd. was used to test the long-afterglow luminescent time.

The phrase "visible to the naked eye" used in the invention is a professional term in the field of long-afterglow luminescent materials, which means that the luminescent brightness of the material is greater than or equal to 0.32 mcd m$^{-2}$ (the unit mcd refers to millicandela), and visible light is usually visible to the naked eye when being at the radiation level of this brightness or above. The phrase "luminescent time" used in the invention is a professional term in the field of the long-afterglow luminescent materials, which means the time elapsed before the luminescent brightness of the material decays to a level visible to the naked eye. The phrase "blue long-afterglow luminescence" used in the invention is the expression of the long-afterglow luminescent color of the material, which means that there is obvious long-afterglow luminescence generated in a blue wavelength interval; and similarly, the description is also accordingly applicable to other colors used in the invention. In actual situations, due to differences in observation methods or influence from individual differences, there may be errors in observation results such as luminescent color or luminescent time.

2. List of Raw Materials Used

| Component | Compound name or number | Source or structure |
|---|---|---|
| A | PdPc | |

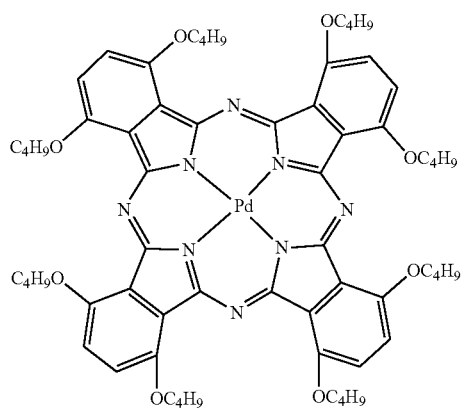

-continued
| Component | Compound name or number | Source or structure |
|---|---|---|
| A | PtTPBP | 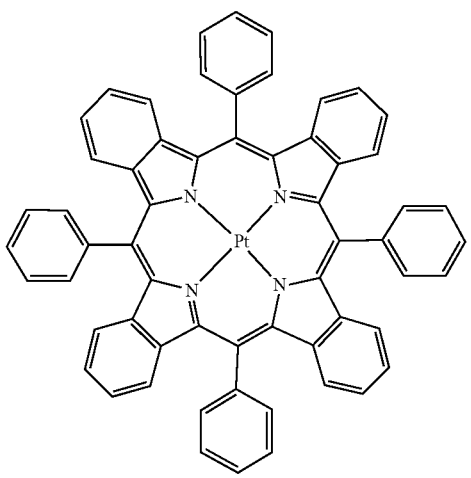 |
| A | Hemin | 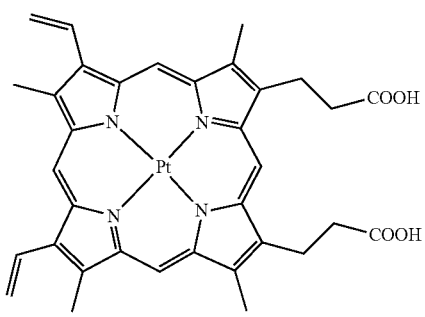 |
| A | PdOEP | 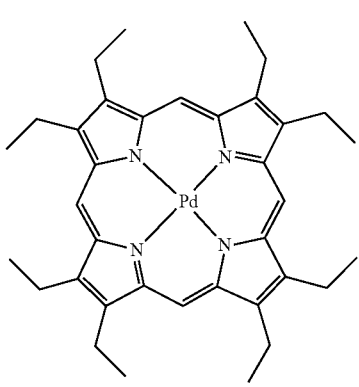 |
| A | Methylene blue (MB-1) | 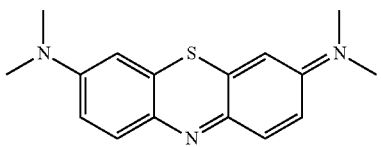 |
| A | PbS quantum dots (PbS) | Suzhou Xingshuo Nanotech Co., Ltd. |
| A | Graphene Quantum Dots (GQDs) | Jiangsu XFNano Material Tech. Co., Ltd. |

-continued
| Component | Compound name or number | Source or structure |
|---|---|---|
| B | Iridium complex (Ir-1) | |
| B | Terbium complex (Tb-1) | |
| B | Europium complex (Eu-1) | |
| B | Iridium complex (Ir-2) | |
| B | BDP-1 | |
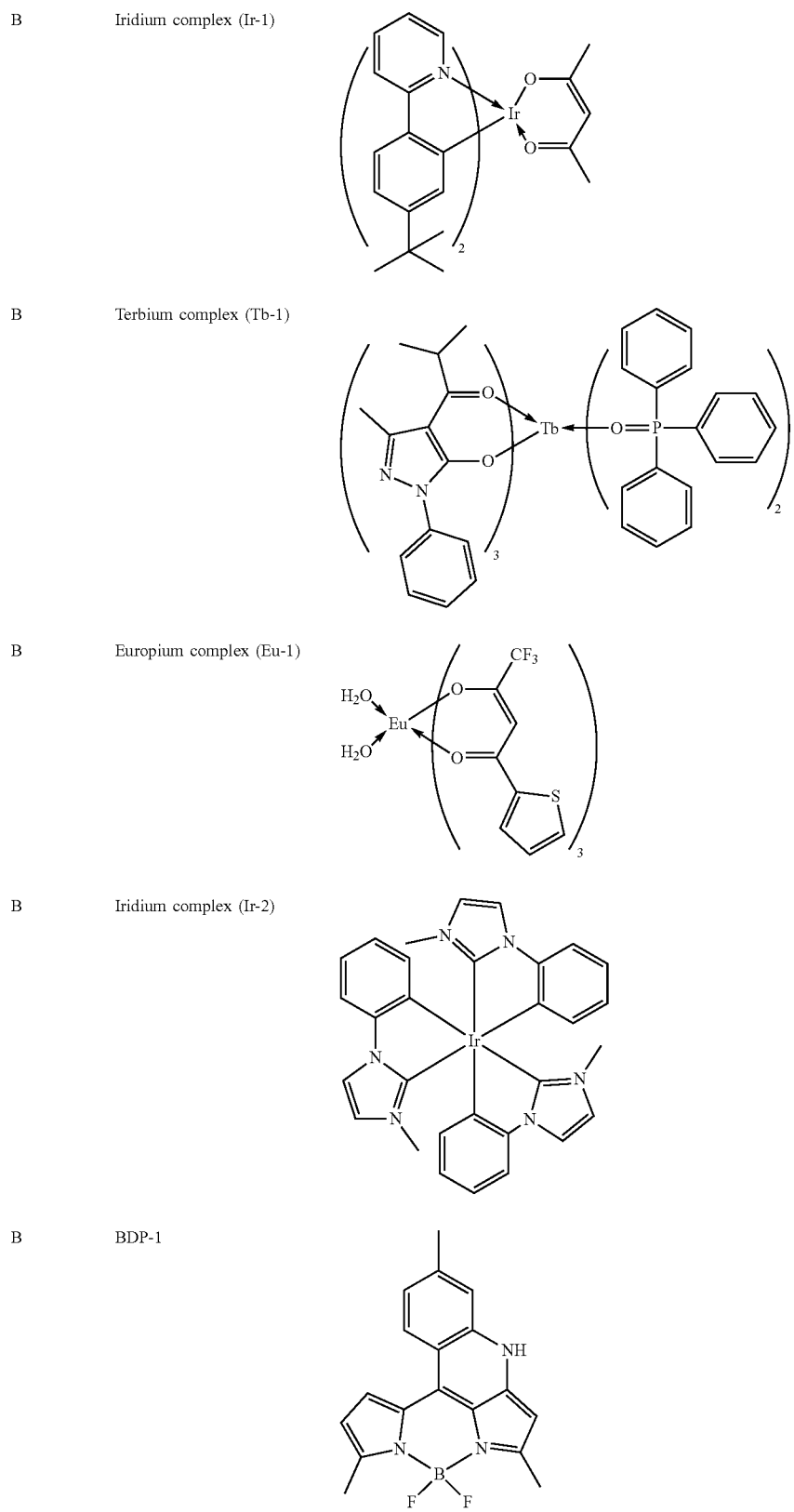

-continued
| Component | Compound name or number | Source or structure |
|---|---|---|
| B | BDP-2 | 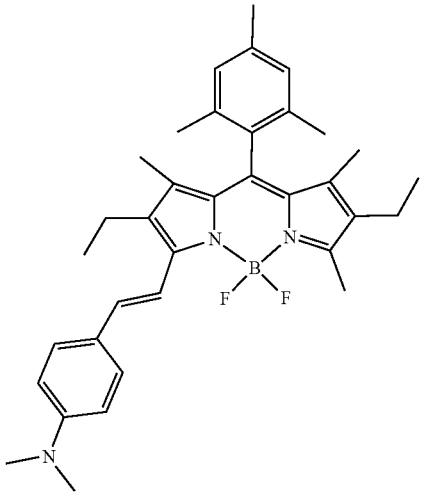 |
| B | BDP-3 | 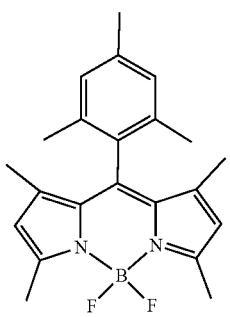 |
| B | Rhodamine B (RhB) | 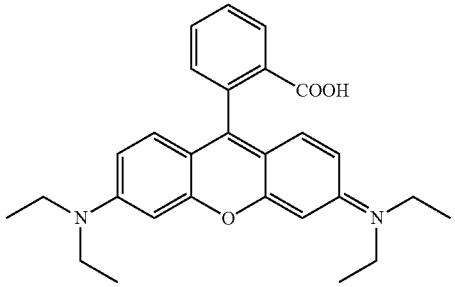 |
| B | Perylene | 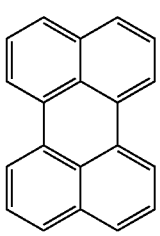 [SMILES: c1cc2cccc3c4cccc5cccc(c(c1)c23)c54] |
| B | Silicon Rhodamine (Rh-1) | 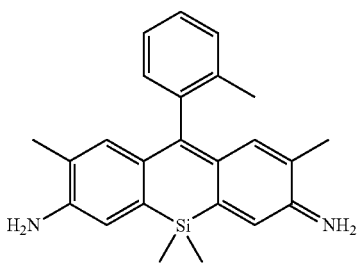 [SMILES: CC1=CC2=C(c3ccccc3C)c3cc(C)c(N)cc3[Si](C)(C)C2=CC1=N] |

-continued
| Component | Compound name or number | Source or structure |
|---|---|---|
| C | Acridin-1 | 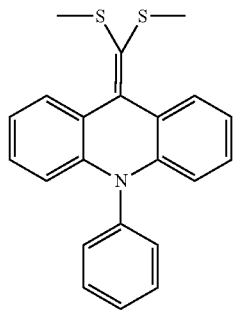 [SMILES: CSC(SC)=C1c2ccccc2N(c2ccccc2)c2ccccc21] |
| C | Acridin-2 | 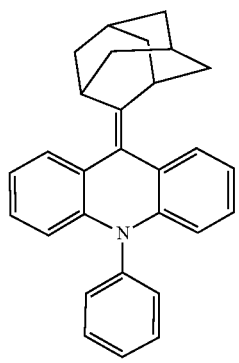 [SMILES: c1ccc(N2c3ccccc3C(=C3C4CC5CC(C4)CC3C5)c3ccccc32)cc1] |
| C | Luminol compound (Luminol-1) | 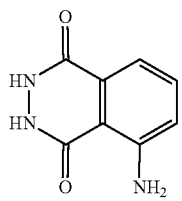 |
| C | Luminol compound (Luminol-2) | 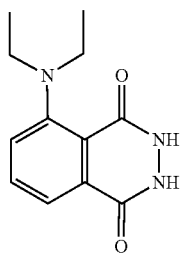 [SMILES: CCN(CC)c1cccc2c(=O)[nH][nH]c(=O)c12] |
| C | EA-1 | 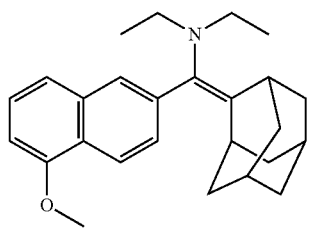 [SMILES: CCN(CC)C(=C1C2CC3CC(C2)CC1C3)c1ccc2c(OC)cccc2c1] |

-continued

| Component | Compound name or number | Source or structure |
|---|---|---|
| C | EA-2 | *(structure)* |
| C | OA-1 | *(structure)* |
| C | OA-2 | *(structure)* |
| C | BT-1 | *(structure)* |
| C | BT-2 | *(structure)* |
| C | CA-1 | |
| C | CA-2 | |

| Component | Compound name or number | Source or structure |
|---|---|---|
| C | CA-3 | |
| C | CA-4 | |
| C | PN-1 | |
| C | MEHPPV used in WO2019/027370A1 | (structure of MEHPPV polymer with OC₂H₅/C₄H₉ side chain and H₃CO group) |
| D | PyD-1 | (structure of N-hydroxymethyl-2-pyridone) |

3. Preparation of Long-Afterglow Material Compositions

Example 1

All components of the photochemical long-afterglow material were mixed in a toluene solvent according to the ratio shown in Table 1, ultrasonic waves were used to assist the dissolution of all the components, and finally a uniform and transparent solution was formed. In the solution, a molar concentration of a photochemical cache agent was 3 mmol $L^{-1}$, and a concentration of a luminescent agent was 1 mmol $L^{-1}$. First, 100 mW $cm^{-2}$ 730 nm light was used for irradiating for 3 s to charge. After charging was completed, the laser was turned off to obtain green long-afterglow luminescence visible to the naked eye. Then, a fluorescence spectrometer and a long-afterglow test system were respectively used to measure the long-afterglow luminescent intensity and luminescent time of the obtained product. The test results were as shown in Table 1.

Examples 2-4

The operation of Example 1 was repeated, and the only difference was that all the components and their contents listed in Table 1 below were used.

Comparative Examples 1-6

The operation of Example 1 was repeated, and the only difference was that all the components and their contents listed in Table 1 below were used.

Comparative Example 7

All components of the photochemical long-afterglow material were mixed in a toluene solvent according to the ratio as shown in Table 2, ultrasonic waves were used to assist the dissolution of all the components, and finally a uniform and transparent solution was formed. In the solution, a molar concentration of a photochemical cache agent was 0 mmol $L^{-1}$, and a concentration of a luminescent agent was 1 mmol $L^{-1}$. First, 100 mW $cm^{-2}$ 730 nm light was used for irradiating for 3 s to charge. After charging was completed, the laser was turned off to obtain green long-afterglow luminescence visible to the naked eye. Then, a fluorescence spectrometer and a long-afterglow test system were respectively used to measure the long-afterglow luminescent intensity and luminescent time of the obtained product. The test results were as shown in Table 2.

Example 5-10

The operation of Comparative Example 7 was repeated, and the only difference was that all the components and their contents listed in Table 2 below were used.

Comparative Examples 8

The operation of Comparative Example 7 was repeated, and the only difference was that all the components and their contents listed in Table 2 below were used.

Example 11

All components of the photochemical long-afterglow material were mixed in a dichloromethane solvent according to the ratio in Table 3, ultrasonic waves were used to assist the dissolution of all the components, and finally a uniform and transparent solution was formed. In the solution, a molar concentration of a photochemical cache agent was 2 mmol $L^{-1}$, and a concentration of a luminescent agent was 1 mmol $L^{-1}$. First, 100 mW $cm^{-2}$ 730 nm light was used for irradiating for 3 s to charge. After charging was completed, the laser was turned off to obtain blue long-afterglow luminescence visible to the naked eye. Then, a fluorescence spectrometer and a long-afterglow test system were respectively used to measure the long-afterglow luminescent intensity and luminescent time of the obtained product. The test results were as shown in Table 3.

Example 12

The operation of Example 11 was repeated, and the only difference was that all the components and their contents listed in Table 3 below were used.

Example 13

All components of the photochemical long-afterglow material were mixed in a dichloromethane solvent according to the ratio in Table 3, ultrasonic waves were used to assist the dissolution of all the components, and finally a uniform and transparent solution was formed. In the solution, a molar concentration of a photochemical cache agent was 2 mmol $L^{-1}$, and a concentration of a luminescent agent was 1 mmol $L^{-1}$. Then, dichloromethane therein was removed to obtain long-afterglow powder without a solvent medium. First, 100 mW $cm^{-2}$ 730 nm light was used for irradiating for 3 s to charge. After charging was completed, the laser was turned off to obtain green long-afterglow luminescence visible to the naked eye. Then, a fluorescence spectrometer and a long-afterglow test system were respectively used to measure the long-afterglow luminescent intensity and luminescent time of the obtained product. The test results were as shown in Table 3.

Example 14

All components of the photochemical long-afterglow material were mixed in a toluene solvent according to the ratio in Table 3, ultrasonic waves were used to assist the dissolution of all the components, and finally a uniform and transparent solution was formed. In the solution, a molar concentration of a photochemical cache agent was 2 mmol $L^{-1}$, and a concentration of a luminescent agent was 1 mmol $L^{-1}$. Then, methylene bis(4-cyclohexyl isocyanate) and polyester polyol were added according to a mass ratio of 1:2, and the total volume of the two substances added was equal to the volume of the above toluene solution. A mixed liquor was stirred uniformly, toluene and dissolved bubbles therein were removed, then the mixed liquor was placed in an oven at 60 degrees Celsius to be dried and cured in the dark, and then a colorless and transparent polyurethane film was formed. First, 100 mW $cm^{-2}$ 730 nm light was used for irradiating for 3 s to charge. After charging was completed, the laser was turned off to obtain green long-afterglow luminescence visible to the naked eye. Then, a fluorescence spectrometer and a long-afterglow test system were respectively used to measure the long-afterglow luminescent intensity and luminescent time of the obtained product. The test results were as shown in Table 3.

Example 15

All components of the photochemical long-afterglow material were mixed in a liquid paraffin solvent according to the ratio in Table 3, ultrasonic waves were used to assist the dissolution of all the components, and finally a uniform and transparent solution was formed. In the solution, a molar concentration of a photochemical cache agent was 2 mmol $L^{-1}$, and a concentration of a luminescent agent was 1 mmol $L^{-1}$. Subsequently, a ten-fold volume of an aqueous solution containing bovine serum albumin (BSA) was added, wherein the concentration of BSA was 10 mg $mL^{-1}$. A mixture was pre-emulsified by using ultrasonic waves (Sonics VC750, Sonics & Materials, Inc) at room temperature for 10 minutes, and then a high-pressure nano homogenizer (FB-110Q, LiTu Mechanical equipment Engineering Co., Ltd) was immediately used to continue emulsification for 20 minutes. An emulsion was heated at 90 degrees Celsius for 1 hour. After the emulsion was cooled to the room temperature, gradient centrifugation and filtration were performed to obtain long-afterglow nanoparticles uniformly dispersed in water. First, 100 mW $cm^{-2}$ 635 nm light was used for irradiating for 3 s to charge. After charging was completed, the laser was turned off to obtain blue long-afterglow luminescence visible to the naked eye. Then, a fluorescence spectrometer and a long-afterglow test system were respectively used to measure the long-afterglow luminescent intensity and luminescent time of the obtained product. The test results were as shown in Table 3.

Example 16-18

The operation of Example 15 was repeated, and the only difference was that the experimental conditions such as all the components and their contents listed in Table 3 below were used.

Example 19

The long-afterglow nanoparticles uniformly dispersed in water were prepared according to Example 15. Subsequently, sodium silicate was added to the above aqueous solution, standing was performed for one day under the condition of pH 8.0, and a silicone hydrogel was prepared by hydrolysis of sodium silicate to obtain long-afterglow hydrogel. First, 100 mW $cm^{-2}$ 730 nm light was used for irradiating for 3 s to charge. After charging was completed, the laser was turned off to obtain green long-afterglow luminescence visible to the naked eye. Then, a fluorescence spectrometer and a long-afterglow test system were respectively used to measure the long-afterglow luminescent intensity and luminescent time of the obtained product. The test results were as shown in Table 3.

Example 20

All components of the photochemical long-afterglow material were mixed in deionized water according to the ratio in Table 3, ultrasonic waves were used to assist the dissolution of all the components, and finally a uniform and transparent solution was formed. In the solution, a molar concentration of a photochemical cache agent was 1 mmol $L^{-1}$, and a concentration of a luminescent agent was 1 mmol $L^{-1}$. Then, dichloromethane therein was removed to obtain long-afterglow powder without a solvent medium. First, 100 mW $cm^{-2}$ 635 nm light was used for irradiating for 3 s to charge. After charging was completed, the laser was turned off to obtain yellow long-afterglow luminescence visible to the naked eye. Then, a fluorescence spectrometer and a long-afterglow test system were respectively used to measure the long-afterglow luminescent intensity and luminescent time of the obtained product. The test results were as shown in Table 3.

Example 21

All components of the photochemical long-afterglow material were mixed in a toluene according to the ratio in Table 4, ultrasonic waves were used to assist the dissolution of all the components, and finally a uniform and transparent solution was formed. In the solution, a molar concentration of a photochemical cache agent was 2 mmol $L^{-1}$, and a concentration of a luminescent agent was 2 mmol $L^{-1}$. First, 100 mW $cm^{-2}$ 635 nm light was used for irradiating for 3 s to charge. After charging was completed, the laser was turned off to obtain green long-afterglow luminescence visible to the naked eye. Then, a fluorescence spectrometer and a long-afterglow test system were respectively used to measure the long-afterglow luminescent intensity and luminescent time of the obtained product. The test results were as shown in Table 4.

Examples 22-28

The operation of Example 21 was repeated, and the only difference was that the experimental conditions such as all the components and their contents listed in Table 4 below were used.

TABLE 1

| Component | Ex 1 | Ex 2 | Ex 3 | Ex 4 | C1 | C2 | C3 | C4 | C5 | C6 |
|---|---|---|---|---|---|---|---|---|---|---|
| A | PdPc | PdPc | PdPc | PdPc | PdPc | PdPc | PdPc | Ir-1 | PdPc | RhB |
| B | Ir-1 | Ir-1 | Ir-1 | Ir-1 | Ir-1 | Ir-1 | Ir-1 | — | MB-1 | Perylene |
| C | CA-1 | CA-1 | CA-1 | CA-1 | CA-1 | CA-1 | MEHPPV | CA-1 | CA-1 | CA-1 |
| D | None | None | None | None | None | None | None | None | None | None |
| E | Toluene | Toluene | Toluene | Toluene | Toluene | Toluene | Toluene | Toluene | Toluene | Toluene |
| A/B molar ratio | 1:500 | 1:1500 | 1:5000 | 1:8000 | 2:1 | 1:15000 | 1:500 | — | 1:500 | 1:500 |
| Excitation wavelength (nm) | 730 | 730 | 730 | 730 | 730 | 730 | 730 | 365 | 730 | 532 |
| Performance Test | | | | | | | | | | |
| Luminescent intensity (a.u.) | 305870 | 98370 | 29080 | 17530 | 130 | 670 | 220 | 3410 | 330 | 1260 |
| Luminescent time (s) | 20.1 | 15.3 | 10.5 | 8.2 | n.m. | n.m. | n.m. | 1.6 | n.m. | n.m. | n.m.: not measurable due to too-low brightness

TABLE 2

| Component | C7 | Ex 5 | Ex 6 | Ex 7 | Ex 8 | Ex 9 | C8 | Ex 10 |
|---|---|---|---|---|---|---|---|---|
| A | PdPc | PdPc | PdPc | PdPc | PdPc | PdPc | PdPc | PdPc |
| B | Ir-1 | Ir-1 | Ir-1 | Ir-1 | Ir-1 | Ir-1 | Ir-1 | Ir-1 |
| C | None | CA-1 | CA-1 | CA-1 | CA-1 | CA-1 | CA-1 | CA-1 |
| Molar concentration of C (mmol $L^{-1}$) | 0 | 0.5 | 1 | 3 | 5 | 10 | 20 | 3 |
| D | None | None | None | None | None | None | None | PyD-1 |
| Content of D (%) | 0 | 0 | 0 | 0 | 0 | 0 | 0 | 0.01 |
| E | Toluene | Toluene | Toluene | Toluene | Toluene | Toluene | Toluene | Toluene |
| A/B molar ratio | 1:500 | 1:500 | 1:500 | 1:500 | 1:500 | 1:500 | 1:500 | 1:500 |
| Performance Test | | | | | | | | |
| Luminescent intensity (a.u.) | 0 | 57170 | 121520 | 306230 | 237690 | 92460 | 5530 | 273580 |
| Luminescent time (s) | n.m. | 13.0 | 15.9 | 20.1 | 18.3 | 14.9 | 2.9 | 23.6 | n.m.: not measurable due to too-low brightness

TABLE 3

| Component | Ex 11 | Ex 12 | Ex 13 | Ex 14 | Ex 15 | Ex 16 | Ex 17 | Ex 18 | Ex 19 | Ex 20 |
|---|---|---|---|---|---|---|---|---|---|---|
| A | PdPc | PdPc | PtTPBP | PbS | PdPc | GQDs | PdPc | PdPc | PdPc | MB-1 |
| B | BDP-1 | RhB | Ir-1 | Tb-1 | Perylene | Tb-1 | BDP-2 | Ir-1 | Ir-1 | RhB |
| C | EA-1 | Luminol-1 | BT-1 | CA-1 | Acridin-1 | CA-1 | OA-1 | CA-1 | CA-1 | CA-2 |
| E | Dichloromethane | Ethanol | Dichloromethane | Polyurethane film | Nano protein | Nano protein | Nano protein | Nano protein | Hydrogel | water |
| A/B molar ratio | 1:500 | 1:500 | 1:500 | 1:500 | 1:500 | 1:500 | 1:500 | 1:500 | 1:500 | 1:500 |
| Excitation wavelength (nm) | 730 | 730 | 635 | 808 | 730 | 532 | 730 | 730 | 730 | 635 |
| Performance Test | | | | | | | | | | |
| Luminescent color | Blue | Yellow | Green | Green | Blue | Green | red | Blue | Green | Yellow |
| Luminescent intensity (a.u.) | 12500 | 9560 | 21690 | 102680 | 37570 | 73160 | 6580 | 56520 | 43270 | 3790 |
| Luminescent time (s) | 186.5 | 5.9 | 68.7 | 15.2 | 11.1 | 14.9 | 260.2 | 12.8 | 11.7 | 2.1 |

TABLE 4

| Component | Ex 21 | Ex 22 | Ex 23 | Ex 24 | Ex 25 | Ex 26 | Ex 27 | Ex 28 |
|---|---|---|---|---|---|---|---|---|
| A | PdOEP | Hemin | PtTPBP | PtTPBP | PtTPBP | PtTPBP | PtTPBP | PtTPBP |
| B | BDP-3 | Eu-1 | Ir-2 | Rh-1 | Eu-1 | Eu-1 | Eu-1 | Eu-1 |
| C | EA-2 | Luminol-2 | BT-2 | CA-3 | Acridin-2 | CA-4 | OA-2 | PN-1 |
| E | Toluene | Ethanol | Dichloromethane | Dichloromethane | Dichloromethane | Dichloromethane | Dichloromethane | Dichloromethane |
| A/B molar ratio | 1:400 | 1:400 | 1:400 | 1:400 | 1:400 | 1:400 | 1:400 | 1:400 |
| Excitation wavelength (nm) | 532 | 532 | 635 | 635 | 635 | 635 | 635 | 635 |
| Performance Test | | | | | | | | |
| Luminescent color | Green | Red | Blue | Red | Red | Red | Red | Red |
| Luminescent intensity (a.u.) | 13690 | 52130 | 32950 | 218270 | 273640 | 480650 | 7150 | 102890 |
| Luminescent time (s) | 320.1 | 31.6 | 81.1 | 18.4 | 14.5 | 21.6 | 351.9 | 38.4 |

The invention claimed is:

1. A long-afterglow luminescent material, comprising:

A) at least one light-absorbing agent;

B) at least one luminescent agent; and

C) at least one photochemical cache agent, wherein the light-absorbing agent and the luminescent agent are compounds having different structures, the light-absorbing agent is at least one compound selected from polymethine cyanine dyes, porphyrin and phthalocyanine dyes and complexes thereof, phycoerythrin, hypocrellin, benzophenone compounds, metal-organic frameworks (MOFs), quantum dots (QDs), and derivatives of these compounds, the luminescent agent is at least one compound selected from iridium complexes, rare-earth complexes, polyfluorene compounds, coumarin compounds, naphthalimide compounds, triacene and higher acene compounds, dipyrromethene boron difluoride compounds (BODIPY), pyrazoline compounds, triphenylamine compounds, carbazole compounds, green fluorescent protein, perovskite luminescent nanomaterials, thermally activated delayed fluorescence (TADF) compounds, and derivatives of these compounds, and the light absorbing agent has a relatively large molar coefficient, the luminescent agent has a relatively high luminescent quantum efficiency, and an absorption peak of the light absorbing agent overlaps an emission peak of the luminescent agent as little as possible;

wherein the cache agent is selected from one or more compounds of formula (II), phenylthiophene compounds of the following formula (IV), luminol compounds of the following formula (IX), phenylimidazole compounds of the following formula (X), and derivatives of these compounds:

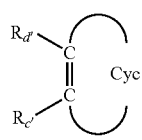
(II)

wherein

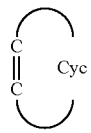

part is a

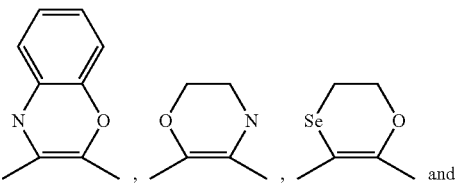
and

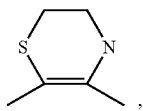

substituted or unsubstituted by one or more groups L, or a combination thereof;

$R_{c'}$ and $R_{d'}$ are each independently aryl, wherein aryl may be substituted by one or more groups L; and L is selected from hydroxyl, nitro, sulfo, halogen, alkyl having 1 to 50 carbon atoms, alkoxy, alkylamino, or a combination thereof;

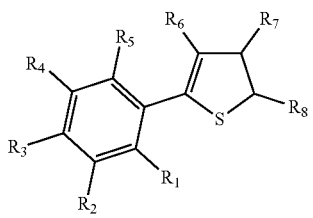
(IV)

-continued

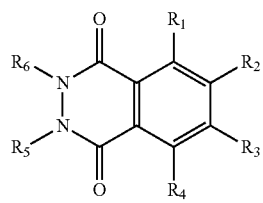
(IX)

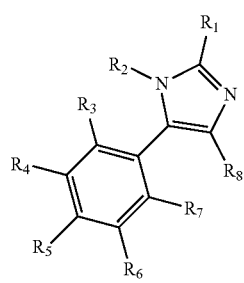
(X)

wherein groups $R_{1-8}$ represent H, amino, halogen, alkyl having 1 to 50 carbon atoms, alkoxy, alkylamino, aryl, or a combination thereof, wherein aryl optionally has one or more substituents L'; and L' is selected from alkyl having 1 to 50 carbon atoms or alkoxy; and wherein a molar ratio of the light-absorbing agent to the luminescent agent is within a range of 1:1.1 to 1:10000, and wherein a content of the photochemical cache agent, by total mass of the three components of the components A) to C), is 0.1% to 80%.

2. The long-afterglow luminescent material according to claim 1, wherein the photochemical cache agent is a non-polymeric compound.

3. The long-afterglow luminescent material according to claim 2, wherein the photochemical cache agent has a molecular weight of less than 2000.

4. The long-afterglow luminescent material according to claim 2, wherein the photochemical cache agent has a molecular weight of less than 1000.

5. The long-afterglow luminescent material according to claim 1, wherein a molar ratio of the light-absorbing agent to the luminescent agent is within a range of 1:10 to 1:8000.

6. The long-afterglow luminescent material according to claim 1, wherein the photochemical cache agent is selected from one or more of the following:

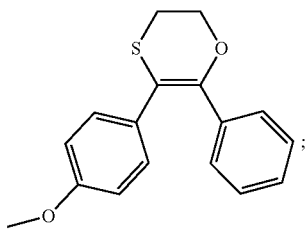

-continued

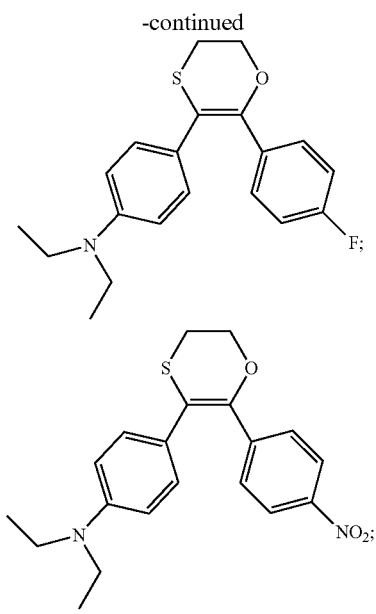

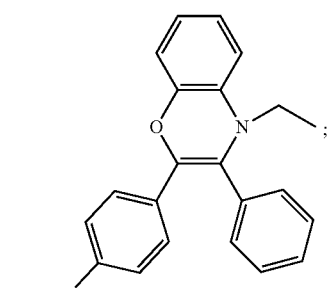

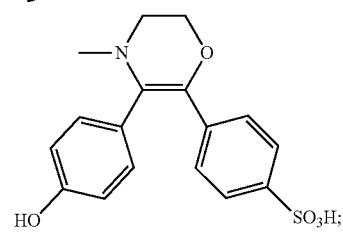

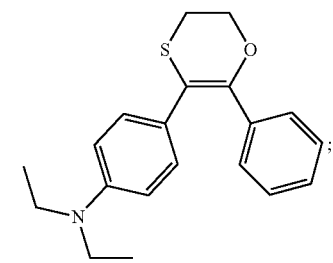

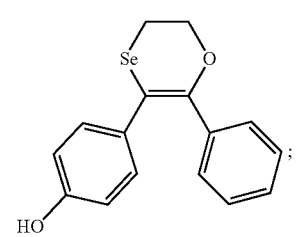

-continued

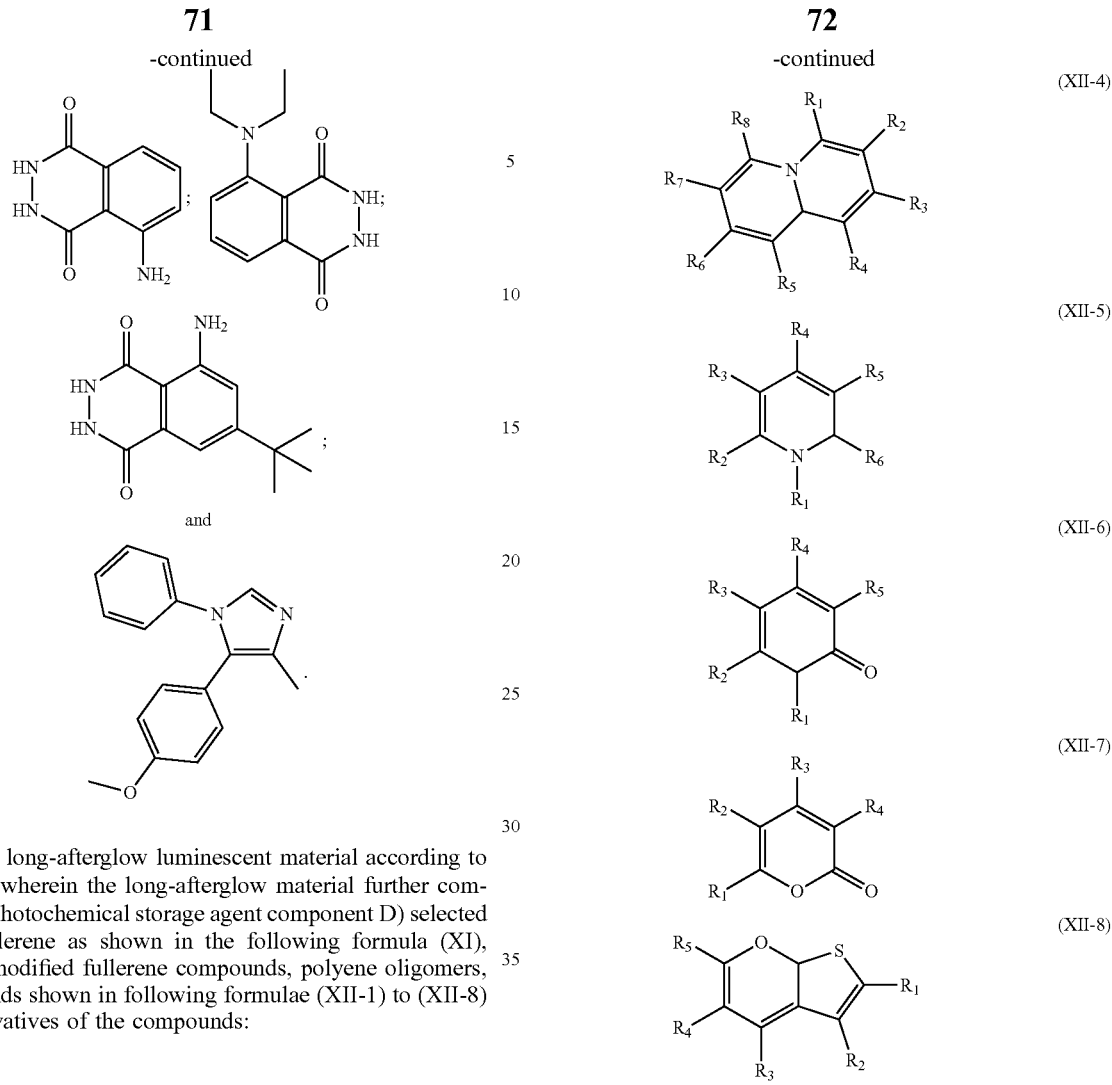

7. The long-afterglow luminescent material according to claim 1, wherein the long-afterglow material further comprises a photochemical storage agent component D) selected from fullerene as shown in the following formula (XI), surface-modified fullerene compounds, polyene oligomers, compounds shown in following formulae (XII-1) to (XII-8) and derivatives of the compounds:

wherein in the above structures, each substituent R' and $R_{1-11}$, represents H, hydroxyl, carboxyl, amino, mercapto, ester, an aldehyde group, nitro, sulfo, halogen, alkyl having 1 to 50 carbon atoms, alkenyl, alkynyl, aryl, alkoxy, or alkylamino, and wherein z represents an integer greater than 1;

wherein a content of the photochemical cache agent, by total mass of the three components of the components A) to C) and D), is 0.1% to 80%.

8. The long-afterglow luminescent material according to claim 7, wherein a content of the photochemical cache agent, by total mass of the three components of the components A) to C) and D), is 0.3% to 60%.

9. The long-afterglow luminescent material according to claim 7, wherein a content of the photochemical cache agent, by total mass of the three components of the components A) to C) and D), is 0.5% to 40%.

10. The long-afterglow luminescent material according to claim 1, wherein a content of the photochemical cache agent, by total mass of the three components of the components A) to C), is 0.3% to 60%.

11. The long-afterglow luminescent material according to claim 1, wherein the long-afterglow material further comprises a carrier medium component E) for dissolving, dispersing or adsorbing the components A) to C).

12. The long-afterglow luminescent material according to claim 11, existing in states or forms of crystal, nanoparticle, powder, film, block, metal-organic framework, composite, organic solvent system, ionic liquid, aqueous solution, aerosol dust, and gel sol.

13. The long-afterglow luminescent material according to claim 11, wherein the carrier medium component E) is selected from an organic solvent, an aqueous phase solvent, a polymeric dispersion medium, a protein, phospholipid liposomes, or adsorptive particles.

14. The long-afterglow luminescent material according to claim 1, comprising, by weight based on a material mixture, no more than 0.1% of rare-earth-doped inorganic luminescent nanoparticles.

15. The long-afterglow luminescent material according to claim 14, comprising, by weight based on a material mixture, no more than 0.01% of the rare-earth-doped inorganic luminescent nanoparticles.

16. The long-afterglow luminescent material according to claim 14, comprising, by weight based on a material mixture, no more than 0.001% of the rare-earth-doped inorganic luminescent nanoparticles.

17. The long-afterglow luminescent material according to claim 14, comprising no rare-earth-doped inorganic luminescent nanoparticles.

18. The long-afterglow luminescent material according to claim 1, wherein L in formula (II) is selected from hydroxyl, sulfo, halogen, nitro, linear or branched alkyl having 1 to 12 carbon atoms, alkoxy, alkylamino, or a combination thereof.

19. The long-afterglow luminescent material according to claim 1, wherein in formula (II)

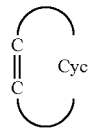

part is

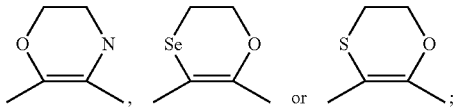

$R_{c'}$ and $R_{d'}$ are each independently selected from phenyl or naphthyl, wherein phenyl or naphthyl may be substituted by one or more groups L; and L is selected from hydroxyl, sulfo, alkyl having 1 to 12 carbon atoms, alkoxy, alkylamino, or a combination thereof.

20. The long-afterglow luminescent material according to claim 1, wherein in formula (IV)
$R_1$, $R_2$, $R_4$ and $R_5$ are independently H;
$R_3$ is alkoxy having 1 to 18 carbon atoms;
$R_6$ and $R_7$ are independently alkyl having 1 to 18 carbon atoms; and
$R_8$ is H or alkyl having 1 to 18 carbon atoms.

21. The long-afterglow luminescent material according to claim 1, wherein in formula (IX)
$R_1$ represents H, amino, or alkylamino having 1 to 18 carbon atoms;
$R_2$, $R_5$ and $R_6$ represent H;
$R_3$ represents H or alkyl having 1 to 18 carbon atoms; and
$R_4$ represents H or amino.

22. The long-afterglow luminescent material according to claim 1, wherein in formula (X)
$R_1$ represents H;
$R_2$ represents phenyl;
$R_3$ represents alkyl having 1 to 18 carbon atoms, alkoxy having 1 to 18 carbon atoms, or alkylamino;
$R_4$ represents H or amino;
$R_5$ represents H or alkoxy; and
$R_6$, $R_7$ and $R_8$ independently represent H or alkyl having 1 to 18 carbon atoms.

23. The long-afterglow luminescent material according to claim 1, wherein a content of the photochemical cache agent, by total mass of the three components of the components A) to C), is 0.5% to 40%.

24. The long-afterglow luminescent material according to claim 1, wherein a molar ratio of the light-absorbing agent to the luminescent agent is within a range of 1:50 to 1:6000.

25. The long-afterglow luminescent material according to claim 1, wherein a molar ratio of the light-absorbing agent to the luminescent agent is within a range of 1:100 to 1:4000.

26. A long-afterglow luminescent material, comprising:
at least one light-absorbing agent selected from polymethine cyanine dyes, porphyrin and phthalocyanine dyes and complexes thereof, phycoerythrin, hypocrellin, benzophenone compounds, metal-organic frameworks (MOFs), quantum dots (QDs), and derivatives of these compounds;
at least one luminescent agent selected iridium complexes, rare-earth complexes, polyfluorene compounds, coumarin compounds, naphthalimide compounds, triacene and higher acene compounds, dipyrromethene boron difluoride compounds (BODIPY), pyrazoline compounds, triphenylamine compounds, carbazole compounds, green fluorescent protein, perovskite luminescent nanomaterials, thermally activated delayed fluorescence (TADF) compounds, and derivatives of these compounds; and
at least one photochemical cache agent selected from one of the following compounds:

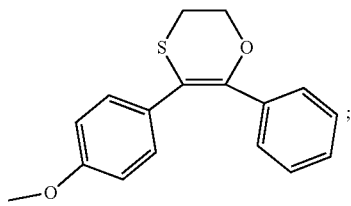

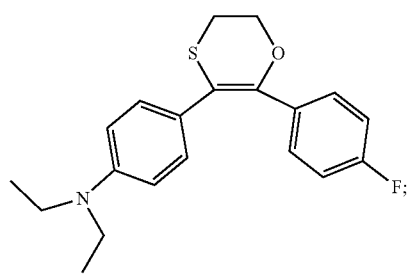

-continued
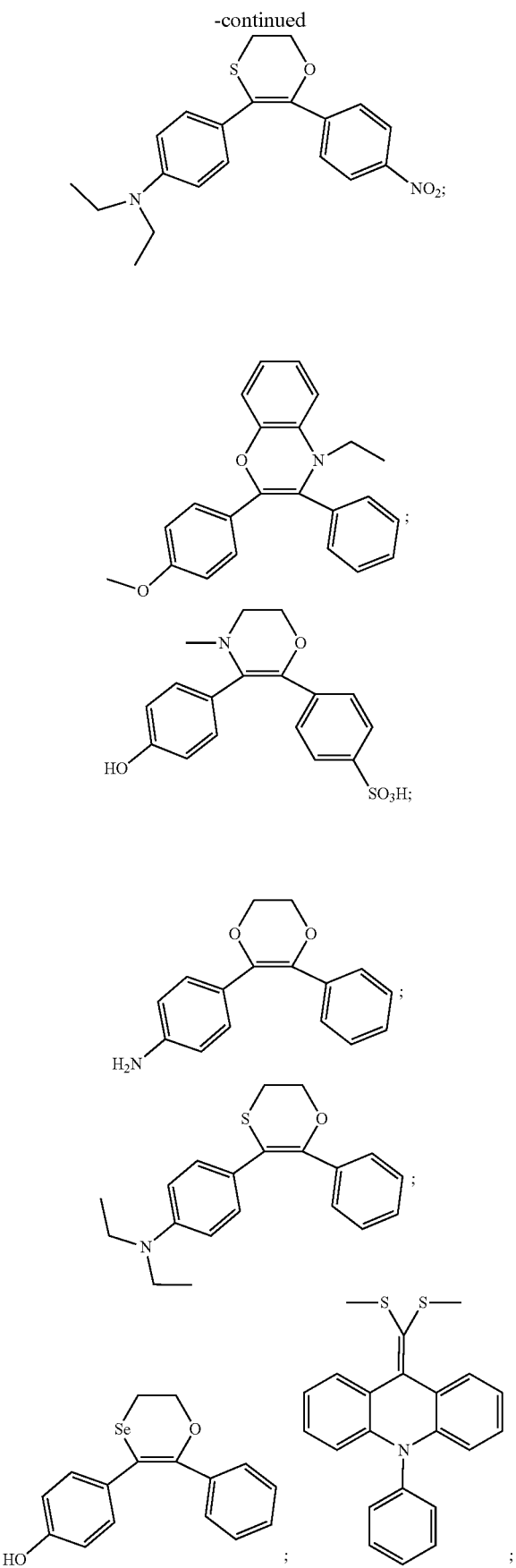
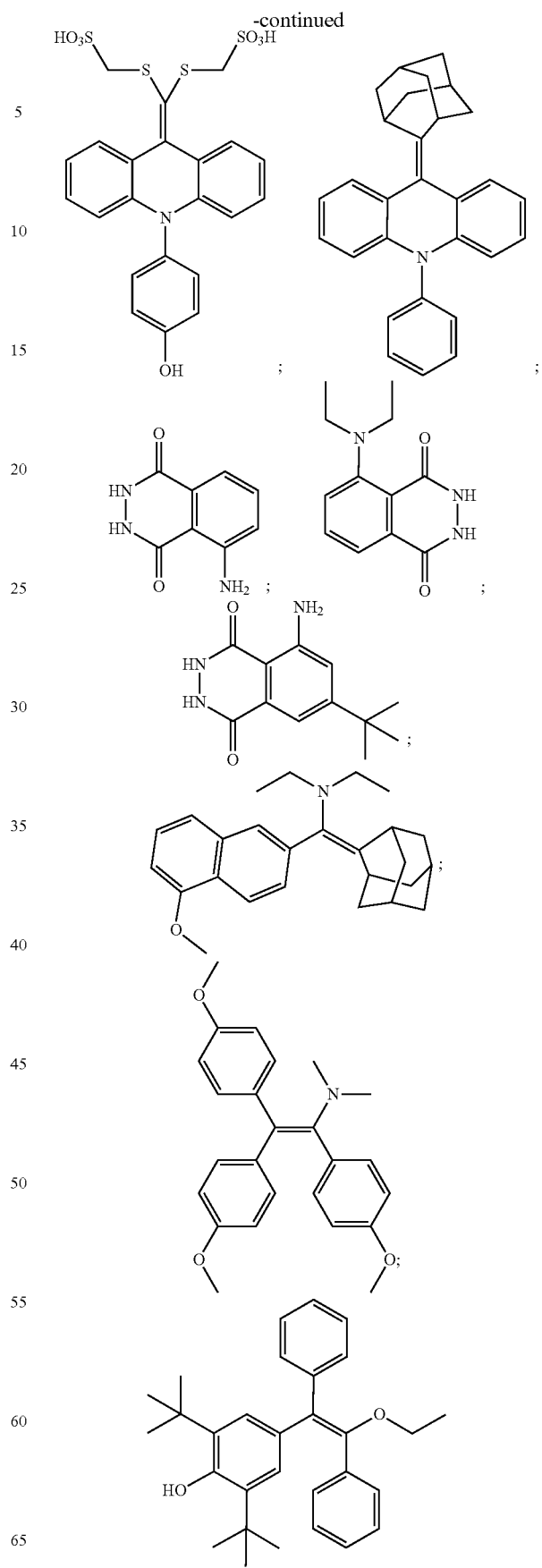

-continued

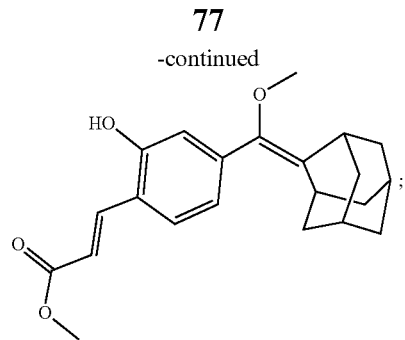

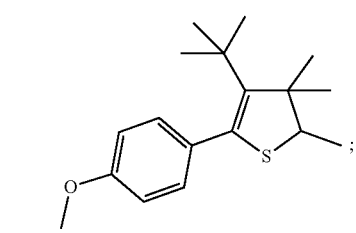

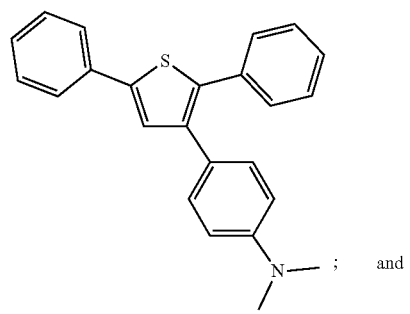

and

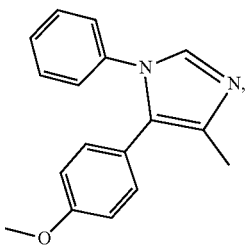

wherein the light absorbing agent has a relatively large molar coefficient, the luminescent agent has a relatively high luminescent quantum efficiency, and an absorption peak of the light absorbing agent overlaps an emission peak of the luminescent agent as little as possible.

27. The long-afterglow luminescent material of claim 26, wherein: the light-absorbing agent is selected from one or more of the following compounds:

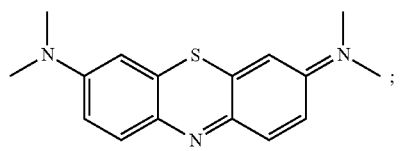

-continued

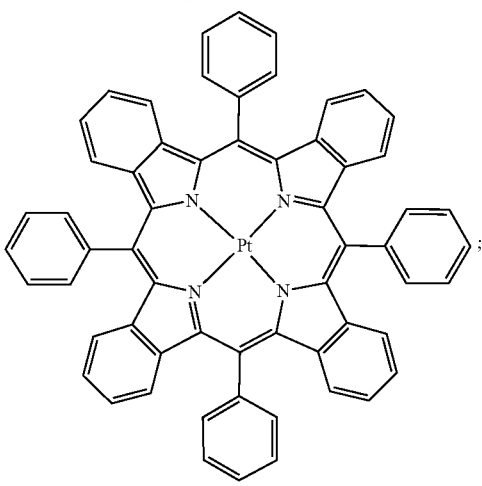

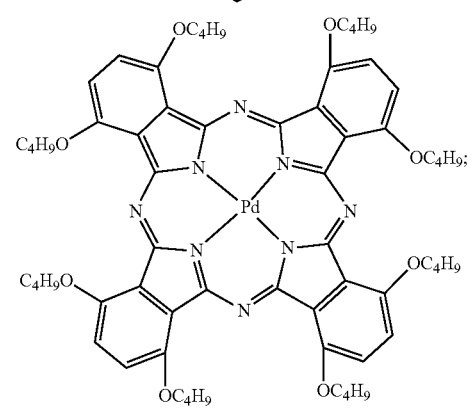

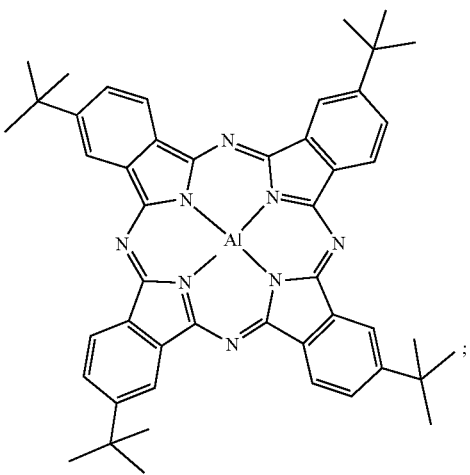

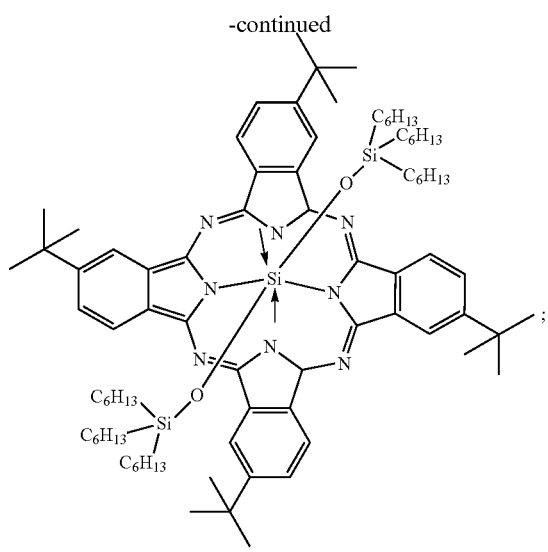
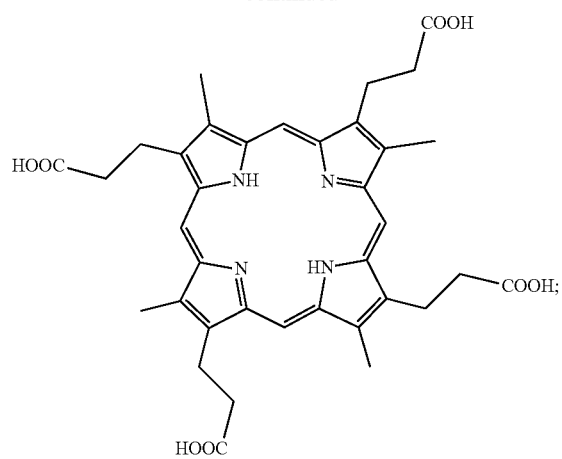
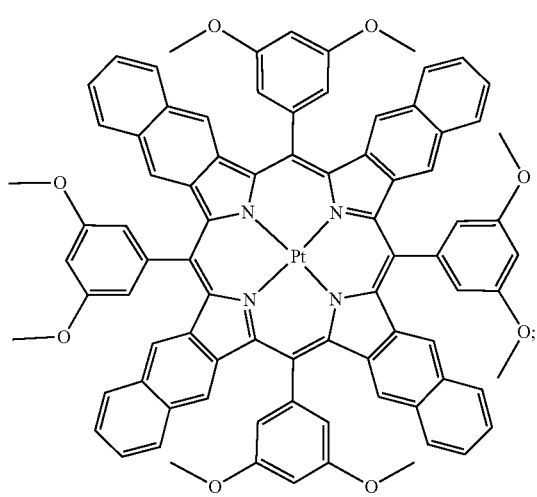
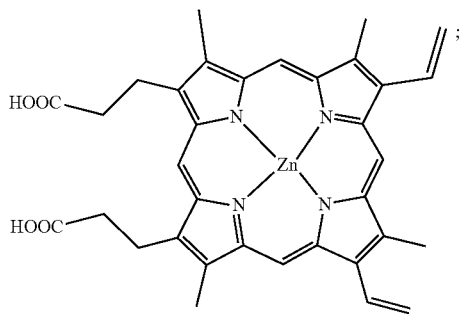
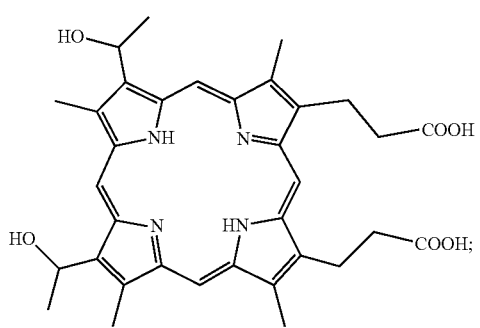
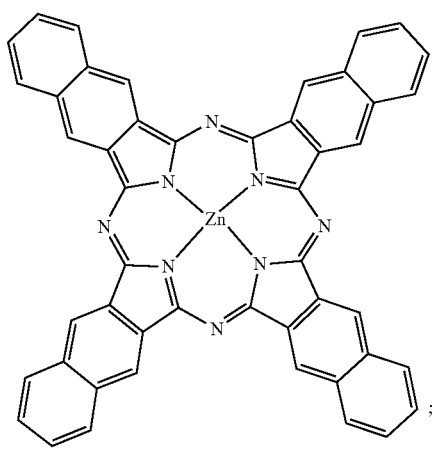
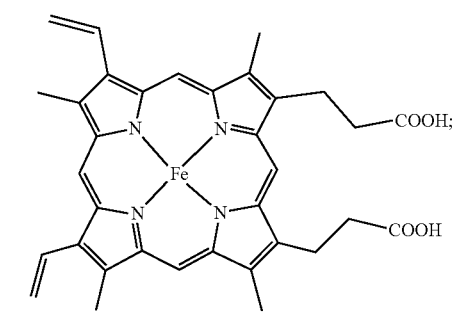

graphene quantum dots; carbon quantum dots; CdSe quantum dots; and PbS quantum dots; and
the luminescent agent is selected from one of the following compounds:
-continued
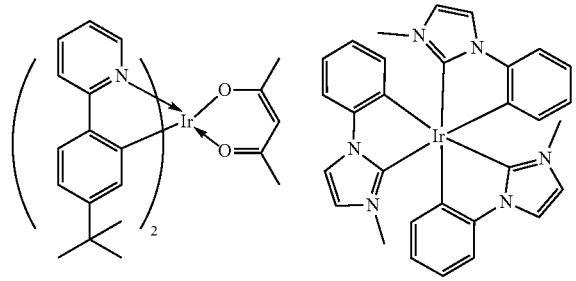
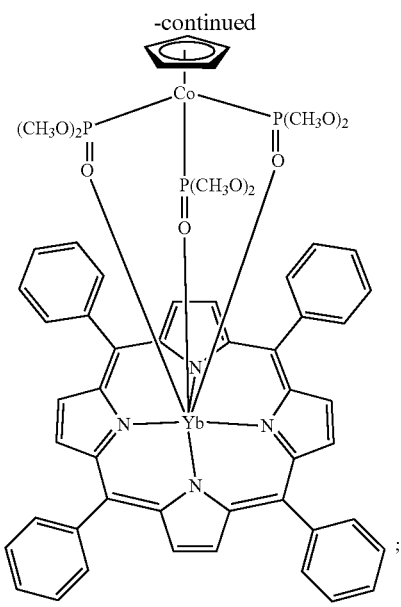
;
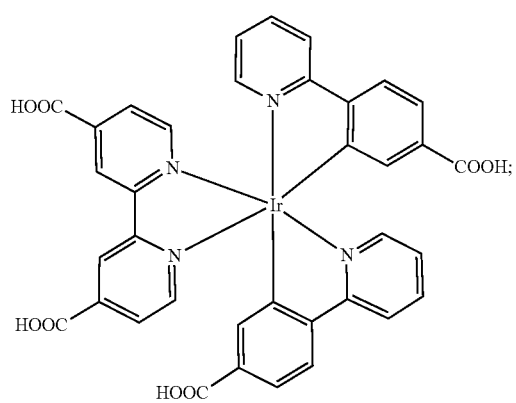
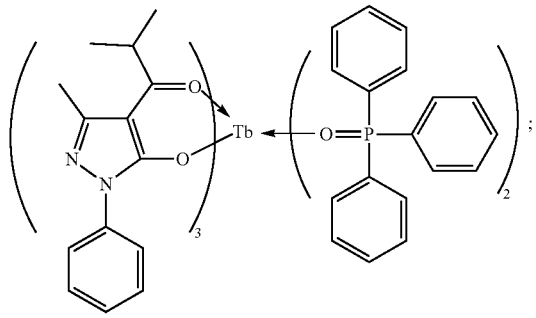
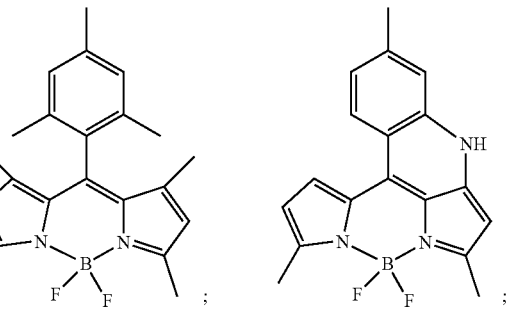
;
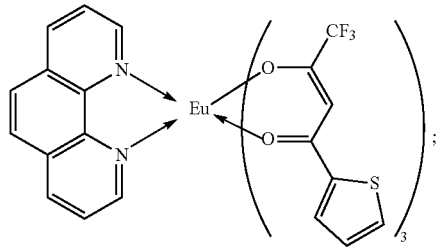
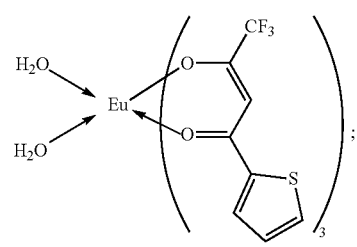
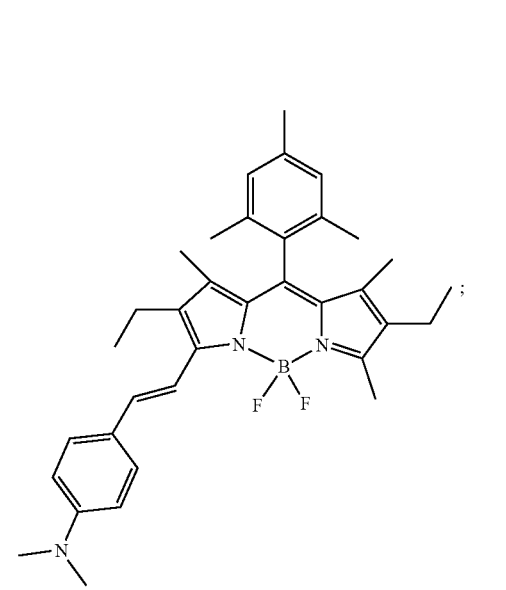

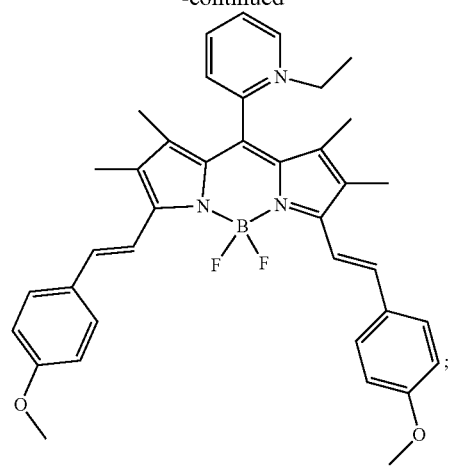
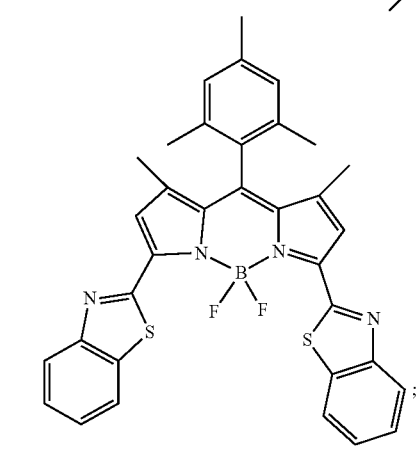
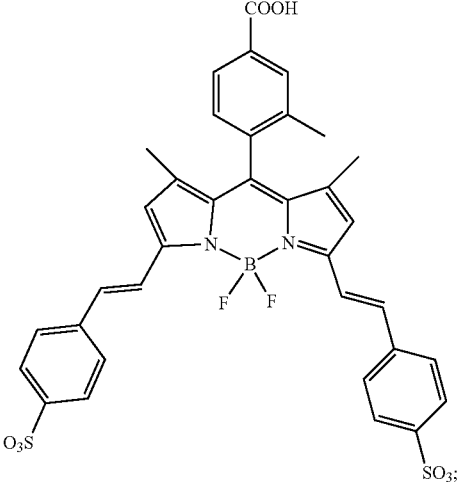
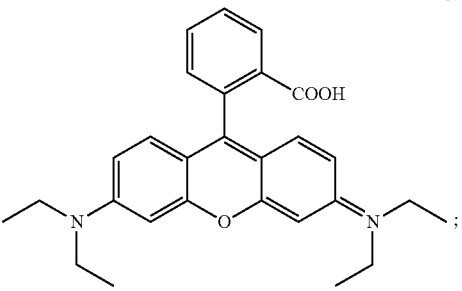
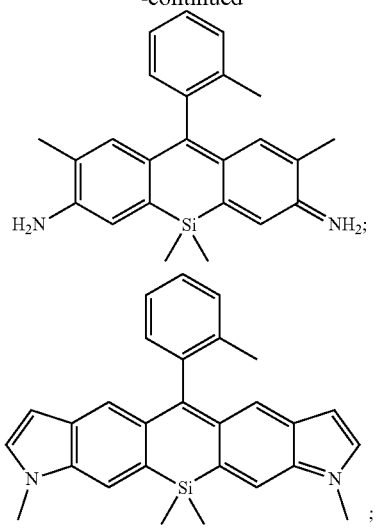
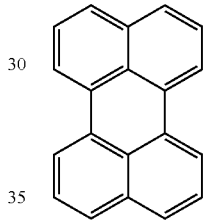
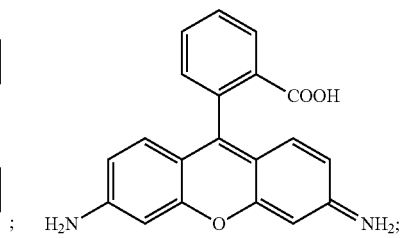
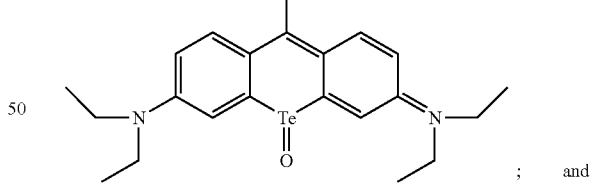
; and
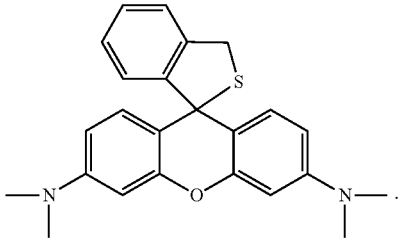
* * * * *

UNITED STATES PATENT AND TRADEMARK OFFICE
CERTIFICATE OF CORRECTION

PATENT NO. : 12,428,598 B2
APPLICATION NO. : 17/600929
DATED : September 30, 2025
INVENTOR(S) : Fuyou Li et al.

Page 1 of 1

It is certified that error appears in the above-identified patent and that said Letters Patent is hereby corrected as shown below:

In the Claims

Column 68, Claim 1, Lines 39-49:

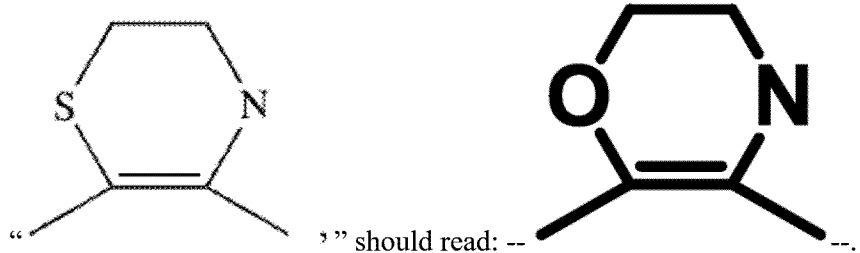

Column 69, Claim 1, Line 25:
"amino, halogen, alkyl" should read: --amino, alkyl--.

Column 69, Claim 1, Line 31:
"alkoxy; and" should read: --alkoxy;--.

Column 71, Claim 6:
After the structure listed in Lines 11-18, above the word "and", insert the following structure:

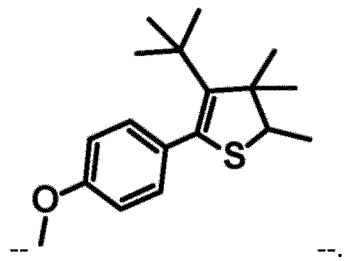

Signed and Sealed this
Twenty-third Day of December, 2025

John A. Squires
*Director of the United States Patent and Trademark Office*